United States Patent
Ogawa

(10) Patent No.: US 8,139,120 B2
(45) Date of Patent: Mar. 20, 2012

(54) IMAGE PROCESSING DEVICE, CAMERA DEVICE AND IMAGE PROCESSING METHOD

(75) Inventor: Tatsuro Ogawa, Nagano (JP)

(73) Assignee: Opt Corporation (JP)

( * ) Notice: Subject to any disclaimer, the term of this patent is extended or adjusted under 35 U.S.C. 154(b) by 629 days.

(21) Appl. No.: 12/300,391

(22) PCT Filed: May 14, 2007

(86) PCT No.: PCT/JP2007/059838
§ 371 (c)(1),
(2), (4) Date: Apr. 22, 2009

(87) PCT Pub. No.: WO2007/132800
PCT Pub. Date: Nov. 22, 2007

(65) Prior Publication Data
US 2010/0045826 A1   Feb. 25, 2010

(30) Foreign Application Priority Data
May 16, 2006   (JP) .................................. 2006-136146

(51) Int. Cl.
*H04N 5/232* (2006.01)
(52) U.S. Cl. .................................. 348/211.99
(58) Field of Classification Search ............. 348/211.99, 348/143
See application file for complete search history.

(56) References Cited

U.S. PATENT DOCUMENTS
7,218,207 B2 * 5/2007 Iwano ........................... 340/435

FOREIGN PATENT DOCUMENTS
JP   2005-135014   5/2005
JP   2005-277698   10/2005
JP   2006-33380   2/2006

OTHER PUBLICATIONS
International Search Report for International Application No. PCT/JP2007/059838 mailed Jul. 31, 2007 with English Translation.
Korean Office Action for Application No. 10-2008-7028523 mailed Feb. 25, 2010 with English translation.

* cited by examiner

*Primary Examiner* — Hung Dang
(74) *Attorney, Agent, or Firm* — Cantor Colburn LLP

(57) ABSTRACT

Provided are an image processing apparatus and method in which, when there is a change in a subject, a picture in which a changing part thereof is enlarged makes it possible to easily confirm whether or not the subject is changing and contents of the changing part. The image processing apparatus (100) for performing an image processing on images obtained by continuously photographing a subject and by imaging light therefrom on image-pickup means (230) through a photographic lens (221) includes: moving part detecting means (110*b*) for detecting a moving part of the image obtained by the photographing, the moving part having occurred due to a change in the subject; moving area image cutting-out means (110*d*) for cutting out, as a moving area image, an area including the image obtained by the photographing corresponding to the moving part in which a move has been detected by the moving part detecting means (110*b*); and corrected/enlarged image generating means (110*e*) for generating a corrected/enlarged image by subjecting the moving area image to a correction processing for a distortion due to the photographic lens and to an enlargement processing.

17 Claims, 9 Drawing Sheets

IMAGE PROCESSING DEVICE, CAMERA DEVICE AND IMAGE PROCESSING METHOD

CROSS REFERENCE TO RELATED APPLICATIONS

This is a U.S. national stage of application No. PCT/JP2007/059838, filed on 14 May 2007. Priority under 35 U.S.C. §119(a) and 35 U.S.C. §365(b) is claimed from Japanese Application No. 2006-136146, filed 16 May 2006, the disclosure of which is also incorporated herein by reference.

TECHNICAL FIELD

The present invention relates to an image processing apparatus, a camera apparatus, and an image processing method.

BACKGROUND ART

JP2004-271902A discloses an example of a monitor camera apparatus including an image processing apparatus for performing an image processing on an image obtained during photographing by imaging light on an image-pickup element such as a charge coupled device (CCD) or complementary metal oxide semiconductor (CMOS) sensor. The monitor camera apparatus is configured to record a picture obtained by the photographing onto a video cassette recorder.
Patent Document 1: JP2004-271902A (refer to description in ABSTRACT and the like)

In a case where, for example, a monitor camera apparatus is used for monitoring and photographing an inside of an uninhabited office during nighttime hours, the photographing is continuously performed on a subject that is not changing as time elapses, for example, an immobile stationary object such as an office desk. In the case of monitoring and photographing such a subject inside the uninhabited office, a particularly necessary picture among pictures obtained by the photographing is a picture obtained when there is an abnormality, namely, a change within a photographed range being monitored. Examples thereof include a picture obtained when there is a change in the subject such as when a person or the like illegally enters the photographed range or when lighting equipment within the photographed range is turned on.

However, even in a case where only a scene in which the subject is changing is to be watched by reproducing photographed contents recorded on a video cassette recorder on a monitor, the photographed and recorded contents need to be watched from the start to the end to confirm whether or not the subject is changing. This raises a problem that a long time is required for a work of confirming whether or not there is an abnormality, namely, a change within a monitored range. In particular, in a case where the picture is obtained by the photographing using a wide-angle photographic lens, the photographed range is wide, and a wide-range picture is displayed on the monitor. This raises a problem that a change in details of the subject is hard to find, and that contents thereof are also hard to confirm.

It is therefore an object of the present invention to provide an image processing apparatus, a camera apparatus, and an image processing method in which even if an image is obtained by photographing a wide range by a wide-angle lens, when there is a change in a subject, a picture in which a changing part thereof is enlarged makes it possible to easily confirm whether or not the subject is changing and also possible to easily confirm contents of the changing part.

OBJECTS AND SUMMARY OF THE INVENTION

In order to solve the above-mentioned problems, an image processing apparatus according to the present invention for performing an image processing on images obtained by continuously photographing a subject and by imaging light therefrom on image-pickup unit through a wide-angle photographic lens, includes: moving part detecting unit for detecting a moving part of the image obtained by the photographing, the moving part having occurred due to a change in the subject; moving area image cutting-out unit for cutting out, as a moving area image, an area including the image obtained by the photographing corresponding to the moving part in which a move has been detected by the moving part detecting unit; and corrected/enlarged image generating unit for generating a corrected/enlarged image by subjecting the moving area image to a correction processing for a distortion due to the photographic lens and to an enlargement processing.

By thus structuring and configuring the image processing apparatus, it is possible to watch the corrected/enlarged image regarding the image of the moving part of the image obtained by the photographing due to the change of the subject, and hence, even if the image obtained by photographing is an image obtained by photographing a wide range by a wide-angle lens, it is possible to easily confirm the contents of the image of the moving part.

Further, according to another invention, in addition to the above-mentioned invention, the moving area image cutting-out unit cuts out, when there are a plurality of moving parts, the moving area image for each of the moving parts.

By thus structuring and configuring the image processing apparatus, with regard to the plurality of moving parts, it is possible to watch the contents of the images of the moving parts as the corrected/enlarged images.

Further, according to another invention, in addition to the above-mentioned invention, the moving area image cutting-out unit cuts out, when the plurality of moving parts exist within a predetermined distance, one moving area image including the plurality of moving parts.

By thus structuring and configuring the image processing apparatus, when the plurality of moving parts exist within the predetermined distance, the plurality of moving parts are cut out as one moving area image, which prevents images having the same contents from being displayed in different places with an overlap.

Further, according to another invention, in addition to the above-mentioned invention, the moving area image cutting-out unit cuts out the moving area image when a moving amount of the moving part exceeds a predetermined moving amount, and the predetermined moving amount differs depending on a position of the moving part in the image obtained by the photographing.

By thus structuring and configuring the image processing apparatus, a detection accuracy for a moving part can be changed depending on a position of the subject in the image obtained by the photographing.

In order to solve the above-mentioned problems, an image processing apparatus according to the present invention for performing an image processing on images obtained by continuously photographing a subject and by imaging light therefrom on image-pickup unit through a wide-angle photographic lens, includes: changing part detecting unit for detecting a changing part of the image obtained by the photographing, the changing part having occurred due to a change in the subject; changing area image cutting-out unit for cutting out, as a changing area image, an area including the image obtained by the photographing corresponding to the changing part in which the change has been detected by the changing part detecting unit; and corrected/enlarged image generating unit for generating a corrected/enlarged image by subjecting the changing area image to a correction processing for a distortion due to the photographic lens and to an enlargement processing.

By thus structuring and configuring the image processing apparatus, it is possible to watch the corrected/enlarged image regarding the image of the changing part of the image obtained by the photographing due to the change of the subject, and hence, even if the image obtained by photographing is an image obtained by photographing a wide range by a wide-angle lens, it is possible to easily confirm the contents of the image of the changing part.

Further, according to another invention, in addition to the above-mentioned invention, the changing area image cutting-out unit cuts out, when there are a plurality of changing parts, the changing area image for each of the changing parts.

By thus structuring and configuring the image processing apparatus, with regard to the plurality of changing parts, it is possible to watch the contents of the images of the changing parts as the corrected/enlarged images.

Further, according to another invention, in addition to the above-mentioned invention, the changing area image cutting-out unit cuts out, when the plurality of changing parts exist within a predetermined distance, one changing area image including the plurality of changing parts.

By thus structuring and configuring the image processing apparatus, when the plurality of changing parts exist within the predetermined distance, the plurality of changing parts are cut out as one changing area image, which prevents images having the same contents from being displayed in different places with an overlap.

In order to solve the above-mentioned problems, an image processing apparatus according to the present invention for performing an image processing on images obtained by continuously photographing a subject and by imaging light therefrom on image-pickup unit through a wide-angle photographic lens, includes: moving part detecting unit for detecting a moving part of the image obtained by the photographing, the moving part having occurred due to a change in the subject; moving area image cutting-out unit for cutting out, as a moving area image, an area including the image obtained by the photographing corresponding to the moving part in which a move has been detected by the moving part detecting unit; changing part detecting unit for detecting a changing part of the image obtained by the photographing, the changing part having occurred due to a change in the subject; changing area image cutting-out unit for cutting out, as a changing area image, an area including the image obtained by the photographing corresponding to the changing part in which the change has been detected by the changing part detecting unit; and corrected/enlarged image generating unit for generating a corrected/enlarged image by subjecting the moving area image or the changing area image to a correction processing for a distortion due to the photographic lens and to an enlargement processing.

By thus structuring and configuring the image processing apparatus, it is possible to watch the corrected/enlarged image regarding the image of the moving part of the image obtained by the photographing due to the change of the subject, and hence, even if the image obtained by photographing is an image obtained by photographing a wide range by a wide-angle lens, it is possible to easily confirm the contents of the image of the moving part. In addition, the corrected/enlarged image can be watched with regard to the image of the changing part of the image obtained by photographing the subject, which makes it also possible to easily confirm the contents of the image of the changing part.

Further, according to another invention, in addition to the above-mentioned invention, the image processing apparatus records the corrected/enlarged image into a recording section.

By thus structuring and configuring the image processing apparatus, it is possible to reproduce only the corrected/enlarged image recorded in the recording section.

Further, according to another invention, in addition to the above-mentioned invention, the image processing apparatus records at least one of a frame number of the corrected/enlarged image and a chapter number thereof into a recording section.

By thus structuring and configuring the image processing apparatus, it is possible to reproduce only the corrected/enlarged image by the frame number or the chapter number recorded in the recording section.

In order to solve the above-mentioned problems, a camera apparatus according to the present invention includes the above-mentioned image processing apparatuses.

By thus structuring and configuring the camera apparatus, it is possible on the camera apparatus to obtain the corrected/enlarged image with regard to the moving part or the changing part.

In order to solve the above-mentioned problems, an image processing method according to the present invention, which performs an image processing on images obtained by continuously photographing a subject and by imaging light therefrom on image-pickup unit through a wide-angle photographic lens, includes: a moving part detecting step of detecting a moving part of the image obtained by the photographing, the moving part having occurred due to a change in the subject; a moving area image cutting-out step of cutting out, as a moving area image, an area including the image obtained by the photographing corresponding to the moving part in which a move has been detected in the moving part detecting step; and a corrected/enlarged image generating step of generating a corrected/enlarged image by subjecting the image obtained by the photographing included in the moving area image to a correction processing for a distortion aberration due to the photographic lens and to an enlargement processing.

By thus defining the image processing method, it is possible to watch the corrected/enlarged image regarding the image of the moving part of the image obtained by the photographing due to the change of the subject, and hence, even if the image obtained by photographing is an image obtained by photographing a wide range by a wide-angle lens, it is possible to easily confirm the contents of the image of the moving part.

In order to solve the above-mentioned problems, an image processing method according to the present invention, which performs an image processing on images obtained by continuously photographing a subject and by imaging light therefrom on image-pickup unit through a wide-angle photographic lens, includes: a changing part detecting step of detecting a changing part of the image obtained by the photographing, the changing part having occurred due to a change in the subject; a changing area image cutting-out step of cutting out, as a changing area image, an area including the image obtained by the photographing corresponding to the changing part in which the change has been detected in the changing part detecting step; and a corrected/enlarged image generating step of generating a corrected/enlarged image by subjecting the image obtained by the photographing included in the changing area image to a correction processing for a distortion aberration due to the photographic lens and to an enlargement processing.

By thus defining the image processing method, it is possible to watch the corrected/enlarged image regarding the image of the changing part of the image obtained by the photographing due to the change of the subject, and hence, even if the image obtained by photographing is an image obtained by photographing a wide range by a wide-angle lens, it is possible to easily confirm the contents of the image of the changing part.

In order to solve the above-mentioned problems, an image processing method according to the present invention, which performs an image processing on images obtained by continuously photographing a subject and by imaging light therefrom on image-pickup unit through a wide-angle photographic lens, includes: a moving part detecting step of detecting a moving part of the image obtained by the photographing, the moving part having occurred due to a change in the subject; a moving area image cutting-out step of cutting out, as a moving area image, an area including the image obtained by the photographing corresponding to the moving part in which a move has been detected by the moving part detecting step; a changing part detecting step of detecting a changing part of the image obtained by the photographing, the changing part having occurred due to a change in the subject; a changing area image cutting-out step of cutting out, as a changing area image, an area including the image obtained by the photographing corresponding to the changing part in which the change has been detected by the changing part detecting step; and a corrected/enlarged image generating step of generating a corrected/enlarged image by subjecting the moving area image or the changing area image to a correction processing for a distortion due to the photographic lens and to an enlargement processing.

By thus defining the image processing method, it is possible to watch the corrected/enlarged image regarding the image of the moving part of the image obtained by the photographing due to the change of the subject, and hence, even if the image obtained by photographing is an image obtained by photographing a wide range by a wide-angle lens, it is possible to easily confirm the contents of the image of the moving part. In addition, the corrected/enlarged image can be watched with regard to the image of the changing part of the image obtained by photographing the subject, which makes it also possible to easily confirm the contents of the image of the changing part.

In order to solve the above-mentioned problems, an image processing apparatus according to the present invention for performing an image processing on images obtained by continuously photographing a subject and by imaging light therefrom on image-pickup unit through a photographic lens, includes: moving part detecting unit for detecting a moving part of the image obtained by the photographing, the moving part having occurred due to a change in the subject; moving area image cutting-out unit for cutting out, as a moving area image, an area including the image obtained by the photographing corresponding to the moving part in which a move has been detected by the moving part detecting unit; and corrected image generating unit for generating a corrected image by subjecting the moving area image to a correction processing for a distortion due to the photographic lens.

By thus structuring and configuring the image processing apparatus, it is possible to watch the corrected image regarding the image of the moving part of the image obtained by the photographing due to the change of the subject, and hence it is possible to easily confirm the contents of the image of the moving part from among the image obtained by the continuous photographing.

In order to solve the above-mentioned problems, an image processing apparatus according to the present invention for performing an image processing on images obtained by continuously photographing a subject and by imaging light therefrom on image-pickup unit through a photographic lens, includes: changing part detecting unit for detecting a changing part of the image obtained by the photographing, the changing part having occurred due to a change in the subject; changing area image cutting-out unit for cutting out, as a changing area image, an area including the image obtained by the photographing corresponding to the changing part in which the change has been detected by the changing part detecting unit; and corrected image generating unit for generating a corrected image by subjecting the changing area image to a correction processing for a distortion due to the photographic lens.

By thus structuring and configuring the image processing apparatus, it is possible to watch the corrected image regarding the image of the changing part of the image obtained by the photographing due to the change of the subject, and hence it is possible to easily confirm the contents of the image of the changing part from among the image obtained by the continuous photographing.

In order to solve the above-mentioned problems, an image processing apparatus according to the present invention for performing an image processing on images obtained by continuously photographing a subject and by imaging light therefrom on image-pickup unit through a photographic lens, includes: moving part detecting unit for detecting a moving part of the image obtained by the photographing, the moving part having occurred due to a change in the subject; moving area image cutting-out unit for cutting out, as a moving area image, an area including the image obtained by the photographing corresponding to the moving part in which a move has been detected by the moving part detecting unit; changing part detecting unit for detecting a changing part of the image obtained by the photographing, the changing part having occurred due to a change in the subject; changing area image cutting-out unit for cutting out, as a changing area image, an area including the image obtained by the photographing corresponding to the changing part in which the change has been detected by the changing part detecting unit; and corrected image generating unit for generating a corrected image by subjecting the moving area image or the changing area image to a correction processing for a distortion due to the photographic lens.

By thus structuring and configuring the image processing apparatus, it is possible to watch the corrected image regarding the image of the moving part of the image obtained by the photographing due to the change of the subject, and hence it is possible to easily confirm the contents of the image of the moving part from among the image obtained by the continuous photographing. In addition, the corrected image can be watched with regard to the image of the changing part of the image obtained by photographing the subject, which makes it also possible to easily confirm the contents of the image of the changing part.

According to the present invention, when there is a change in a subject, a picture in which a changing part thereof is enlarged is obtained, and hence it is possible to easily confirm whether or not the subject is changing and also possible to easily confirm contents of the changing part.

DESCRIPTION OF REFERENCE NUMERALS

100 . . . image processing apparatus
110a . . . changing part detecting section (changing part detecting unit)
110b . . . moving part detecting section (moving part detecting unit)
110c . . . changing area image cutout processing section (changing area image cutting-out unit)
110d . . . moving area image cutout processing section (moving area image cutting-out unit)
110e . . . corrected/enlarged image generating section (corrected/enlarged image generating unit)
221 . . . photographic lens
230 . . . image-pickup element (image-pickup unit)
300 . . . HDD (recording section)
500 . . . camera apparatus

BEST MODE FOR CARRYING OUT THE INVENTION

First Embodiment

Description is made of an image processing apparatus 100 according to a first embodiment of the present invention by referring to FIGS. 1 to 7(G). Note that an image processing method is described along with an operation of the image processing apparatus 100.

Figure 1:
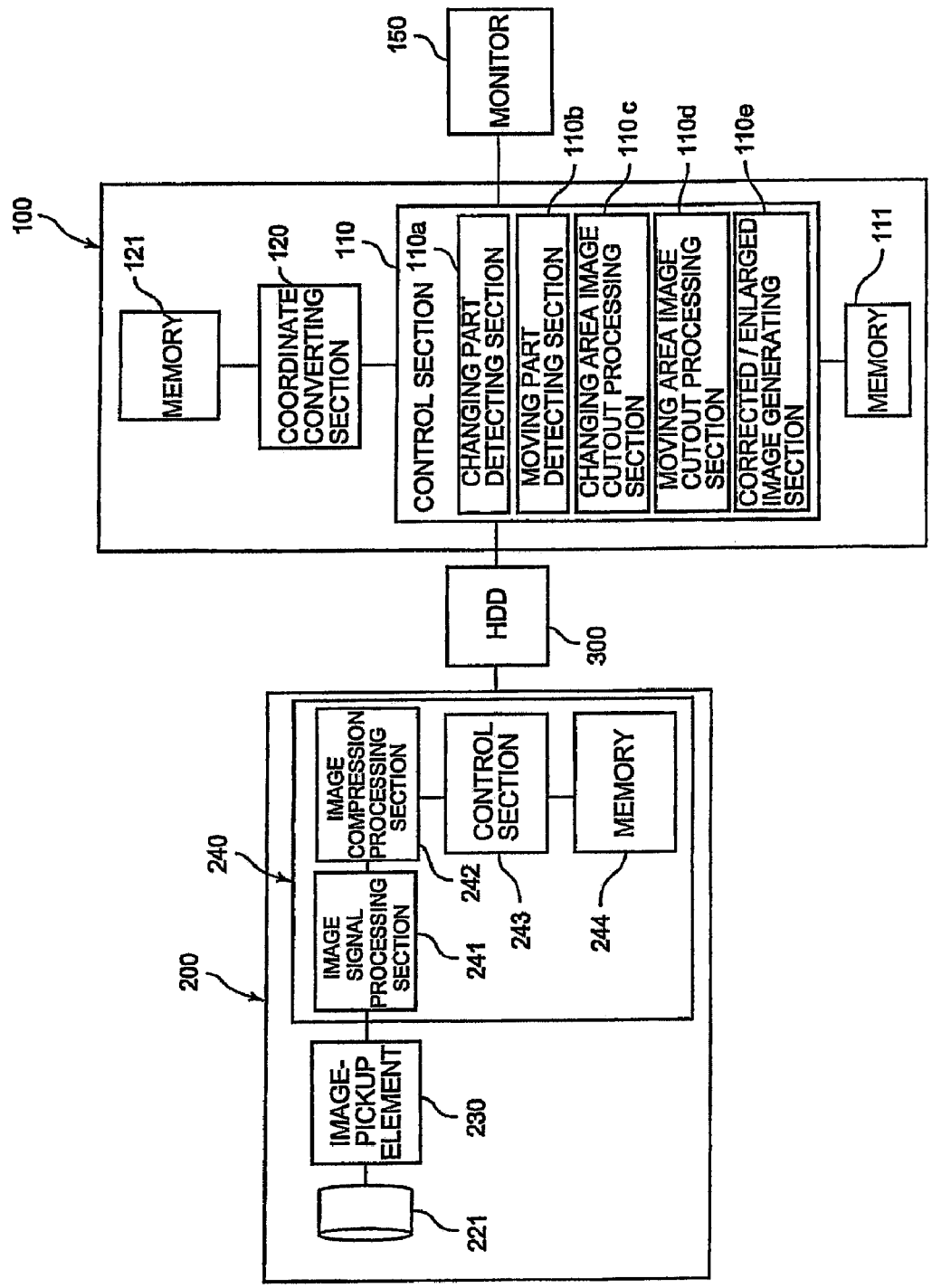
FIG. 1 is a block diagram illustrating a configuration illustrated by including a camera section, an HDD, and a monitor in a configuration of an image processing apparatus according to a first embodiment of the present invention.

As illustrated in FIG. 1, a case is shown in which the image processing apparatus 100 is used when an image obtained by photographing is read from a hard disk drive (hereinafter, referred to as "HDD") 300 serving as recording unit in which an image obtained by photographing by a camera section 200 is recorded, and is displayed on a monitor 150.

Figure 2:
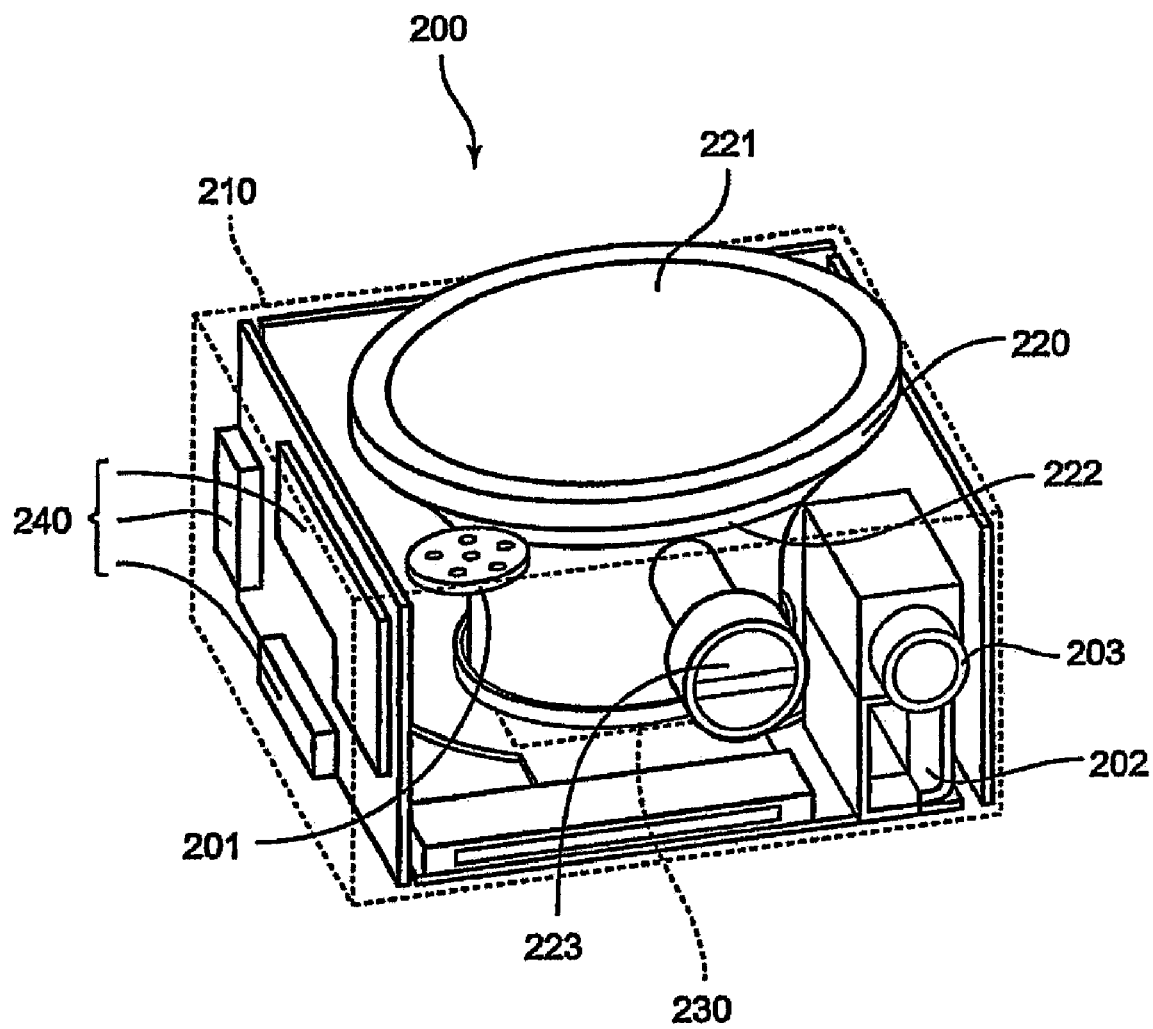
FIG. 2 is a perspective view illustrating a structure of the camera section of FIG. 1.

First, FIG. 2 is referenced to describe a structure of the camera section 200. The camera section 200 includes an external casing 210 illustrated by the dotted lines of FIG. 2, an optical system 220, an image-pickup element 230 serving as image-pickup unit, and a circuit device 240. The external casing 210 has a small shape exhibiting substantially a flat rectangular parallelepiped of 3 cm in horizontal and vertical lengths and 1 cm in height. The optical system 220 has a photographic lens 221 and a lens-barrel 222.

The optical system 220 has the lens-barrel 222 received inside the external casing 210, and has the photographic lens 221 exposed to an outside of the external casing 210. The photographic lens 221 is a so-called wide-angle lens having such an optical characteristic as a wide angle of view of 180 degrees. On a front surface being a side from which light from a subject is incident, the photographic lens 221 exhibits a bulge approximately the same as that of an ordinary convex lens, which is close to a flat plane. However, glass inside a lens is elaborately processed to provide an angle of view of 180 degrees, and can photograph over an entire perimeter about an optical axis, namely, a 360-degree perimeter.

The image-pickup element 230 is disposed in an imaging position of the photographic lens 221. For example, a CMOS sensor is used as the image-pickup element 230. Instead of the CMOS sensor, a CCD or other such photoelectric element may be used.

The lens-barrel 222 is equipped with a focusing knob 223. The lens-barrel 222 is structured to move back and forth along the optical axis with respect to the image-pickup element 230 when the focusing knob 223 is held by fingers of a hand to be rotated about the optical axis. Therefore, the focusing knob 223 makes it possible to adjust a position in the optical axis of the photographic lens 221 so that the imaging position of the photographic lens 221 falls on an image-pickup surface of the image-pickup element 230.

In this embodiment, a size of the image-pickup surface of the image-pickup element 230 and a layout of the photographic lens 221 and the image-pickup element 230 are set in such a manner that an entirety of an image obtained by imaging light coming through the photographic lens 221 is included within the image-pickup surface of the image-pickup element 230. Therefore, on the image-pickup surface of the image-pickup element 230, a circular image is obtained by the imaging in correspondence with a shape of the photographic lens 221.

Further, the camera section 200 includes a microphone 201, a universal serial bus (USB) connection section 202 to which a USB cable is connected and which serves as communication unit, and an AV signal outputting section 203 for outputting an audio signal and a video signal. The microphone 201 captures a sound in a place within a range being photographed.

FIG. 1 is a block diagram illustrating a configuration of the image processing apparatus 100 according to the first embodiment of the present invention by including the camera section 200. An image obtained by photographing by the camera section 200 is subjected to an image processing by the circuit device 240 and recorded onto the HDD 300.

Light from the subject transmitted through the photographic lens 221 is imaged on the image-pickup surface of the image-pickup element 230, and an image signal based on an image obtained by the imaging is output from the image-pickup element 230. The image signal output from the image-pickup element 230 is input to the circuit device 240. The circuit device 240 includes an image signal processing section 241, an image compression processing section 242, a control section 243, and a memory 244 provided to the control section 243, which constitute the image processing apparatus.

The image signal output from the image-pickup element 230 is input to the image signal processing section 241. In the image signal processing section 241, the image signal output from the image-pickup element 230 is subjected to a predetermined image processing such as a color processing.

In the image compression processing section 242, image data on the image signal that has been subjected to the image processing in the image signal processing section 241 is subjected to a compression processing to generate compressed image data in which a data amount of the image data is reduced. The compression processing for the image data is performed by using, for example, joint photographic experts group (JPEG).

The control section 243 is configured by, for example, a central processing unit (CPU), and administers control on the operation of the camera section 200. The memory 244 not only contains a program for operating each section of the camera section 200, but also is provided with a work memory for executing the program. The image signal processing section 241 and the image compression processing section 242 also make use of the memory 244 for their processings.

A picked-up image obtained by photographing by the camera section 200 having the above-mentioned configuration is recorded onto the HDD 300. Then, the image obtained by the photographing and recorded on the HDD 300 is displayed onto the monitor 150 via the image processing apparatus 100, and the picked-up image obtained by the photographing by the camera section 200 is watched.

Next, description is made of the configuration of the image processing apparatus 100. The image processing apparatus 100 includes a control section 110, a memory 111 included in the control section 110, a coordinate converting section 120, and a memory 121 included in the coordinate converting section 120.

The control section 110 is configured by, for example, a CPU, and administers control on the operation of the image processing apparatus 100 including a generation processing for a picture for displaying the image obtained by the photographing and read from the HDD 300 onto the monitor 150. The control section 110 includes a changing part detecting section 110a as changing part detecting unit, a moving part detecting section 110b as moving part detecting unit, a changing area image cutout processing section 110c as changing area image cutting-out unit, a moving area image cutout processing section 110d as moving area image cutting-out unit, and a corrected/enlarged image generating section 110e as corrected/enlarged image generating unit.

The coordinate converting section 120 performs the image processing for generating a picture for displaying on the monitor 150 based on the image data of a photographed image obtained from the HDD 300 together with the control section 110. The coordinate converting section 120 has a function of converting a coordinate position of an image picked up on the image-pickup surface of the image-pickup element 230 into a coordinate position of a picture on the monitor 150 when the image picked up on the image-pickup surface of the image-pickup element 230 is to be subjected to the image processing and is to be displayed on the monitor 150. The memory 121 is a work memory used for performing the image processing by using the coordinate converting section 120.

Next, description is made of an outline of an operation of the image processing apparatus 100 having the above-mentioned configuration.

It is assumed that image data on images obtained by causing the camera section 200 to continuously photograph a subject at a predetermined frame rate, for example, at 16 frames/sec or 30 frames/sec is recorded on the HDD 300.

While the images obtained by photographing and recorded on the HDD 300 are being reproduced, in a case where there is a change in contents of images obtained by the photographing at photographic frames adjacent in photographed time instant, the image processing apparatus 100 cuts out an image corresponding to an area containing a changing part within the image obtained by the photographing as a changing area image, and also subjects the changing area image to a correction of a distortion aberration of the photographic lens 221 and displays a corrected/enlarged image resulted from enlargement onto the monitor 150. In addition, in a case where there is a moving part in the image obtained by the photographing, the image processing apparatus 100 cuts out an image corresponding to an area containing the moving part as a moving area image, and also subjects the moving area image to a correction of a distortion aberration due to the photographic lens 221 and displays a corrected/enlarged image resulted from enlargement onto the monitor 150.

For example, the camera section 200 is placed in an inside of an uninhabited office during nighttime hours to perform monitoring and photographing, and image data on images obtained by the photographing is recorded onto the HDD 300. In this case, the inside of an uninhabited office during nighttime hours serving as a subject is a subject that is originally immobile. Therefore, the images obtained by the photographing and recorded on the HDD 300 are almost the same images obtained by the photographing in which the subject is hardly moving.

However, in a case where there is a change in the state of the subject when an electric light is turned on inside the dark office during night time hours, there is a difference in the contents of the images obtained by the photographing between the image obtained by the photographing before the electric light is turned on and the image obtained by the photographing after the electric light is turned on. Alternatively, in a case where a person illegally enters the inside of the uninhabited office, there is a difference in the contents of the images obtained by the photographing between the image obtained by the photographing before the person illegally enters and the image obtained by the photographing after the illegal entry. Further, in a case where the person who has illegally entered is, for example, walking about the inside of the office, the person is photographed as the moving part in the image obtained by the photographing.

Therefore, in a case where the images obtained by the photographing and recorded on the HDD 300 are reproduced by the image processing apparatus 100, in the course of the reproduction, when there comes a scene in which the images obtained by the photographing, in which the electric light is turned on inside the dark office or the person illegally enters the inside of the uninhabited office, are being reproduced, the images obtained by the photographing corresponding to an area including an electric light part and the person are subjected to the correction of the distortion aberration due to the photographic lens 221, and corrected/enlarged images resulted from enlargement are displayed onto the monitor 150.

Therefore, even in a case where an entire subject within an angle of view of the photographic lens 221 is displayed on the monitor 150, the corrected/enlarged image is displayed onto the monitor 150 when there is a change in the image obtained by the photographing, to thereby prevent the change in the subject from being missed and make it possible to automatically watch the picture of the subject corresponding to the changing part with accuracy.

Hereinafter, description is made of the detailed configuration and operation of the image processing apparatus 100 for performing such an operation as outlined above.

First described is detection of a changing part of an image obtained by photographing, which is performed by the changing part detecting section 110a. The detection of a changing part of an image obtained by photographing is performed as follows. Pixels that exist in the same position in the images obtained by the photographing at the adjacent photographic frames are compared with each other in terms of image information such as a luminance level. Then, in a case where a plurality of pixels having different image information exist in one place, an image of a pixel part in which the pixels exist in one place is judged as the changing part.

For example, in the case where a person illegally enters the inside of an uninhabited office, with regard to the image obtained by the photographing at a photographic frame before the person illegally enters and the image obtained by the photographing at a photographic frame after the person illegally enters, there occurs a difference in pixel information between the pixels existing in the same position before and after the person illegally enters. Therefore, the image obtained by the photographing corresponding to the pixel part in which the person is photographed of the image obtained by the photographing at a photographic frame after the person illegally enters is detected as the changing part.

Also in the case where an electric light is turned on inside a dark office, with regard to the image obtained by the photographing at a photographic frame before the electric light is turned on and the image obtained by the photographing at a photographic frame after the electric light is turned on, there occurs a difference in pixel information between the pixels existing in the same position before and after the electric light is turned on. Therefore, the image obtained by the photographing corresponding to the pixel part in which the electric light in an on state is photographed of the image obtained by the photographing at a photographic frame after the electric light is turned on is detected as the changing part.

Note that the plurality of pixels in a cluster are compared in terms of the pixel information because a change in the pixel due to a noise is not handled as the change in the image obtained by the photographing. For example, even if there is no change in the subject, there is a case where only one pixel is changed in the pixel information due to the noise. The comparison is performed because such a change in the pixel information due to the noise is not judged as the change in the subject. For example, if there is a change in pixels with 10 pixels or more in height and 10 pixels or more in width, it is judged that there is a change in the subject, and therefore the changing part occurs in the image obtained by the photographing.

Next described is detection of a moving part of an image obtained by photographing, which is performed by the moving part detecting section 110b. The images obtained by the photographing at the photographic frames adjacent in time sequence are compared with each other, and it is detected whether or not each of the images obtained by the photographing contains a plurality of pixels in a cluster which are different in image formation position and exhibit an approximate distribution of pixel information. If the images obtained by the photographing at the adjacent photographic frames contain such a plurality of pixels, the plurality of pixels are judged as the moving part.

For example, in a case where a person is moving (walking) against an immobile background, in each of the images obtained by the photographing at the photographic frames adjacent in time sequence, the plurality of pixels in a cluster, in which the person is photographed, exhibit the approximate distribution of pixel information. Therefore, with regard to the respective images obtained by the photographing at the adjacent photographic frames, the presence/absence of the plurality of pixels in a cluster which exhibit the approximate distribution of pixel information is detected, and the pixel position of the plurality of the pixels existing in one place is compared between the adjacent images obtained by the photographing. If there is a difference, the image obtained by the photographing of a part corresponding to the plurality of pixels in a cluster is detected as the moving part.

Figure 3:
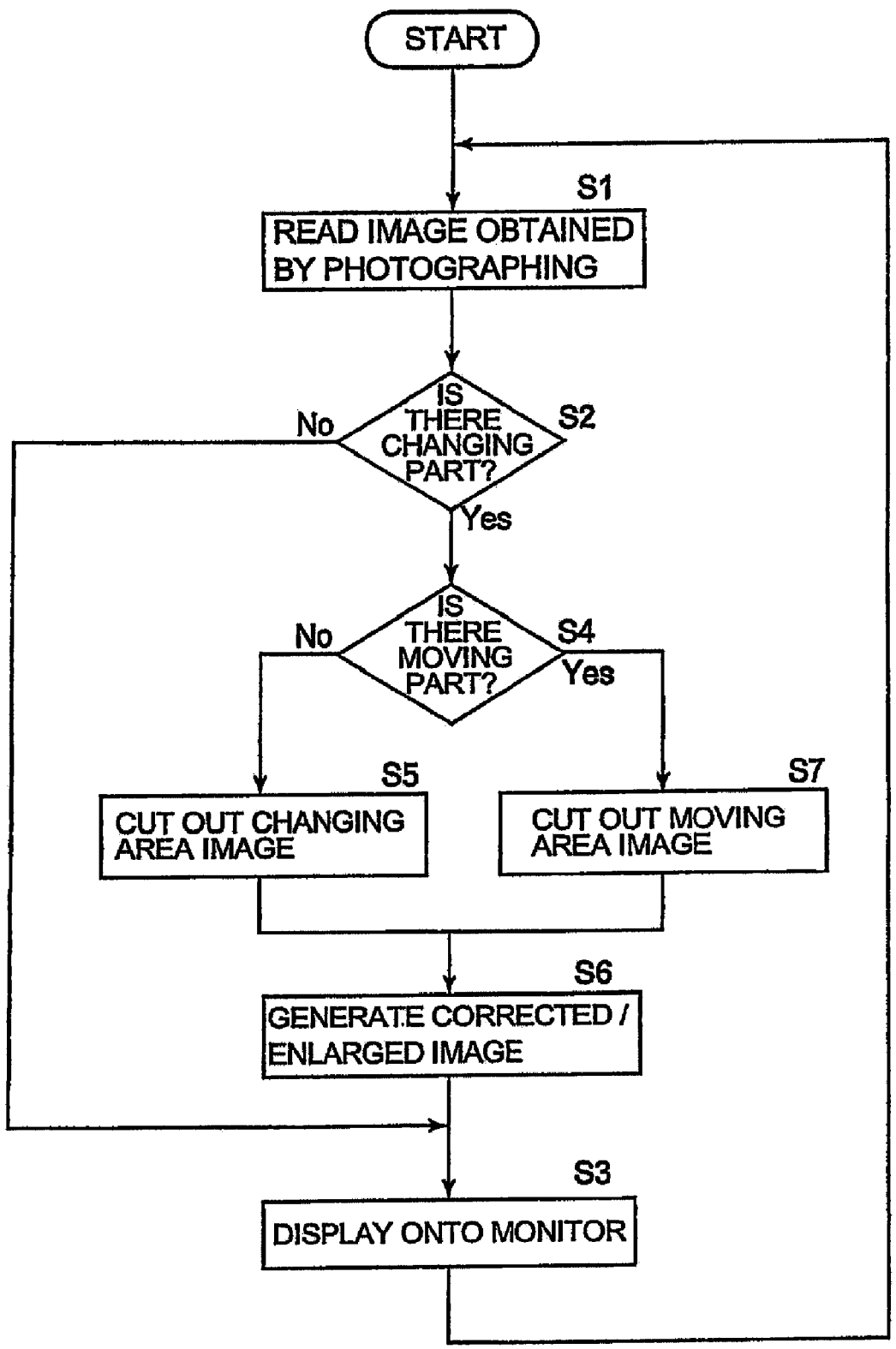
FIG. 3 is a flowchart illustrating an operation of the image processing apparatus of FIG. 1.

Next, by referring to FIGS. 3 to 5(F), description is made of a specific operation of the image processing apparatus 100. FIG. 3 is a flowchart illustrating a flow of the image processing. Further, FIGS. 4(A)-(F) illustrate images obtained by photographing an inside of a room 400, which is the inside of an originally uninhabited office during the nighttime hours or on holiday, as a subject by the camera section 200, the images being recorded on the HDD 300. Note that the camera section 200 is provided to a sealing. The photographing is sequentially performed in such an order as parts (A), . . . , (B), (C), (D), (E), (F), . . . of FIG. 4. FIGS. 5(A)-(F) illustrate contents of pictures displayed on the monitor 150 after the images obtained by the photographing and recorded on the HDD 300, which are illustrated in parts (A), . . . , (B), (C), (D), (E), (F), . . . of FIG. 4, are subjected to the image processing by the image processing apparatus 100. FIGS. 5(A), 5(B), 5(C), 5(D), 5(E), and 5(F) correspond to FIGS. 4(A), 4(B), 4(C), 4(D), 4(E), and 4(F), respectively.

As described above, the photographic lens 221 has an angle of view of 180 degrees, and can photograph over the entire perimeter about the optical axis, namely, a 360-degree perimeter. Further, the size of the image-pickup surface of the image-pickup element 230 and the layout of the photographic lens 221 and the image-pickup element 230 are set in such a manner that the entirety of the image obtained by imaging light coming through the photographic lens 221 is included within the image-pickup surface of the image-pickup element 230. Therefore, on the image-pickup surface of the image-pickup element 230, as illustrated in FIGS. 4(A) to 4(F), a circular image is obtained by the imaging in correspondence with a shape of the photographic lens 221.

Figure 4A:
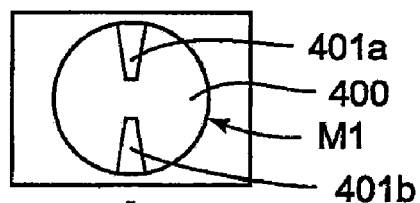
FIGS. 4(A)-(F) are diagrams illustrating contents of images obtained by photographing and recorded on the HDD illustrated in FIG. 1.

The room 400 is originally uninhabited. Therefore, while there is no moving object inside the room 400, as illustrated in FIG. 4(A), photographic images M1 of the inside of the room 400 each including entrances 401a and 401b that are stationary objects are recorded on the HDD 300 by the number of photographic frames during a photographed time period. The photographic images M1 of the respective photographic frames are different in photographed time instant, but since no part that is moving is included inside the room 400, namely, the subject, images obtained by photographing which have the same contents as the images obtained by the photographing are recorded on the HDD 300 as the picked-up images M1 of a plurality of photographic frames.

Figure 4B:
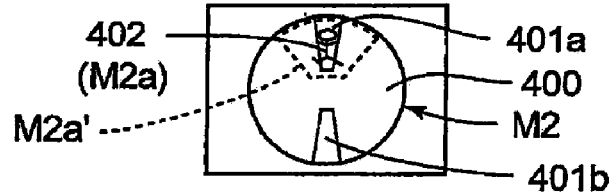

However, as illustrated in FIG. 4(B), when a person 402 is about to illegally enter the room 400 through the entrance 401a, a photographic image M2 is obtained by the photographing, and is recorded onto the HDD 300. Then, while the person 402 is moving inside the room 400, a photographic image M3 illustrated in FIG. 4(C) and a photographic image M4 illustrated in FIG. 4(D) are sequentially obtained by the photographing, and are recorded onto the HDD 300. Then, after the person 402 has moved away out of the room 400 through the entrance 401b, since there is nothing moving left inside the room 400, as illustrated in FIGS. 4(E) and 4(F), photographic images M5 and M6 of the inside of the room 400 including the entrances 401a and 401b are obtained by the photographing, and are recorded onto the HDD 300. In the same manner as the photographic images M1, photographic images M6 are recorded by the number of photographic frames during a succeeding photographed time period.

Note that the photographic images M1, M2, M3, M4, M5, and M6 are of continuous photographic frames. Further, since photographing is performed at ten and several frames to several tens of frames per second, a distance by which the person 402 moves between the continuous photographic frames is slight. Therefore, an actual movement amount by which the person 402 moves between the continuous photographic frames in the images obtained by the photographing is also slight. However, herein, for the sake of explanation, the movement amount in the images obtained by the photographing is indicated to be large, making it easy to recognize that the person 402 is moving.

Next, by referring to the flowchart of FIG. 3, description is made of the image processing performed when the photographic images M1, M2, M3, M4, M5, and M6 recorded on the HDD 300 are reproduced.

Figure 5A:
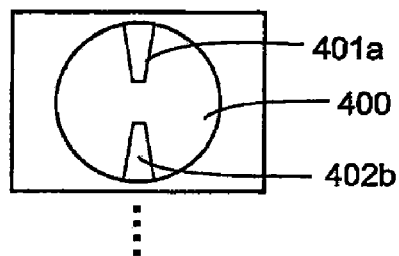
FIGS. 5(A)-(F) are diagrams illustrating pictures obtained when the images obtained by photographing and recorded on the HDD illustrated in FIG. 1 are displayed on the monitor after being subjected to an image processing by the image processing apparatus.

First, images obtained by photographing and recorded on the HDD 300 are read every photographic frame in an order of the photographic time instant (Step S1). Herein, the photographic image M1 is first read. Then, with regard to the photographic image M1, it is judged in the changing part detecting section 110a whether or not the photographic image M1 includes a changing part (Step S2). As described above, the judgment is performed based on the presence/absence of a cluster of pixels different in pixel information in comparison with an image obtained by the photographing at a photographic frame earlier in time instant. The photographic image M1 is an image obtained by photographing at a first photographic frame, which means no image obtained by the photographing is available for the comparison, and is therefore judged as including no changing part (No in Step S2). Then, a picture corresponding to the photographic image M1 is displayed onto the monitor 150 as illustrated in FIG. 5(A) (Step S3). The picture of FIG. 5(A) displayed on the monitor 150 is obtained by displaying the image of the photographic image M1 in a state where a mode of an image of a photographed range or the like is as it is. In other words, contents of an image picked up by the image-pickup element 230 through the photographic lens 221 are displayed as they are. In the following description, the picture on the monitor 150 in which an entirety of the photographed range photographed by the photographic lens 221 is displayed is referred to as an "entire range picture".

Subsequently, a second photographic frame is read. The second photographic frame is set as a photographic frame obtained before the person 402 illustrated in FIG. 4(B) has illegally entered the room 400 yet. Therefore, the photographic image M1 having the same subject content as the photographic image M1 of the first photographic frame is read. Then, it is judged in the changing part detecting section 110a whether or not the photographic image M1 of the second photographic frame includes a changing part (Step S2). In other words, the judgment is performed based on the presence/absence of the cluster of pixels different in pixel information in comparison between the picked-up image M1 of the first photographic frame and the photographic image M1 of the second photographic frame. There is no change in the subject photographed at the first and second photographic frames, and hence there is no change in the pixel information on the pixels of the photographic images M1 of the first and second photographic frames. Therefore, it is judged in the changing part detecting section 110a that there is no changing part in the photographic images M1 of the first and second photographic frames (No in Step S2), and the entire range picture illustrated in FIG. 5(A) is displayed onto the monitor 150 in the same manner as the photographic image M1 of the first photographic frame.

Until the person 402 has illegally entered the room 400, there occurs no change in the photographic image M1 of each photographic frame, and hence the reading of an image obtained by photographing (Step S1), the judgment resulting in negative as to whether or not there is a changing part (No in Step S2), and the displaying of the entire range picture onto the monitor 150 (Step S3) are repeatedly performed. In other words, the entire range picture illustrated in FIG. 5(A) is kept being displayed on the monitor 150.

Then, when the photographic image M2 illustrated in FIG. 4(B) is read as the image obtained by the photographing when the person 402 illegally enters the room 400 (Step S1), it is judged that the photographic image M2 includes a changing part (Yes in Step S2). In comparison between the picked-up image M2 and the photographic image M1 of the photographic frame preceding the photographic frame at which the picked-up image M2 is obtained by the photographing, the person 402 who is not photographed in the photographic image M1 is photographed in the photographic image M2. In terms of a person image part M2a corresponding to a pixel part in which the person 402 is photographed, the photographic image M2 is different from the photographic image M1 with the cluster of the pixel information. In other words, the person image part M2a is judged as the changing part of the photographic image M2 (Yes in Step S2).

Subsequently, it is judged whether or not the photographic image M2 includes a moving part (Step S4). As described above, whether or not the photographic image M2 includes a moving part is judged, in comparison between the photographic image M2 and the photographic image M1 that is an image obtained by the photographing at the photographic frame preceding the photographic frame at which the photographic image M2 is obtained by the photographing, based on whether or not both contain a plurality of pixels in a cluster which exhibit an approximate distribution of pixel information, and whether or not a formation position of the plurality of pixels in the image obtained by the photographing is different. With regard to the photographic images M1 and M2, the entrances 401a and 401b are each a plurality of pixels in a cluster which exhibit an approximate distribution of pixel information, but are not different in the formation position of the plurality of pixels in the image obtained by the photographing, and hence are not judged as a moving part. Further, with regard to the person image part M2a of the photographic image M2, a plurality of pixels having a distribution of the pixel information approximate to that of the part do not exist in the photographic image M1. Therefore, it is judged that the photographic image M2 does not include a moving part (No in Step S4).

Then, an image of an area including the person image part M2a is cut out as a changing area image M2a' by the changing area image cutout processing section 110c (Step S5). Herein, an image area over approximately ¼ of a range in a peripheral direction of a contour of the photographic image M2 is cut out as the changing area image M2a'.

Figure 5B:
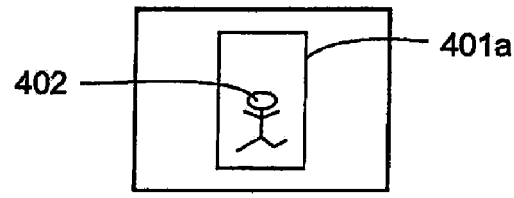

Then, the cut-out changing area image M2a' is subjected by the corrected/enlarged image generating section 110e to the correction of the distortion aberration due to the photographic lens 221 and to an enlargement processing (Step S6), and as illustrated in FIG. 5(B), the changing area image M2a' is displayed onto the monitor 150 as the picture resulting from the enlargement without a distortion (Step S3). Note that in the correction of the distortion aberration and the enlargement processing that are performed by the corrected/enlarged image generating section 110e, an interpolation processing for pixel data or the like is performed on image data on the changing area image M2a'. The same holds true to the correction of the distortion aberration and the enlargement processing for other changing area images and moving area images that are described later.

Figure 4C:
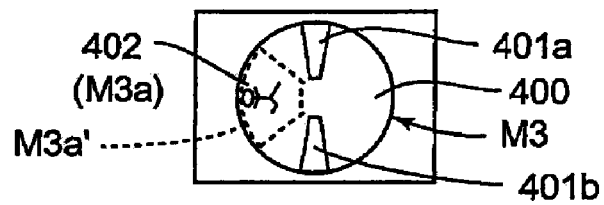
Figure 4D:
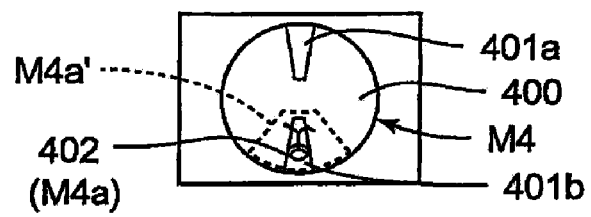
Figure 4E:
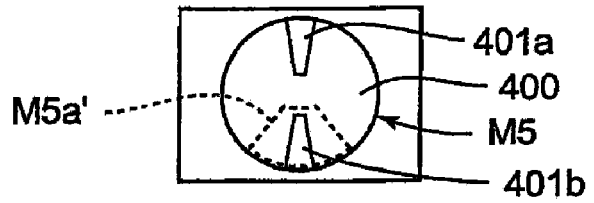
Figure 4F:
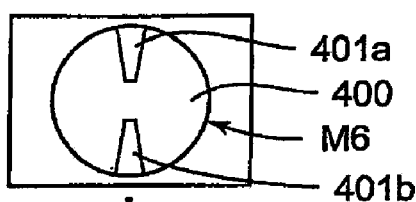

Subsequently, the photographic image M3 illustrated in FIG. 4(C) is read as the image obtained by the photographing at the photographic frame succeeding the photographic frame at which the photographic image M2 is obtained by the photographing (Step S1). In comparison between the photographic image M3 and the photographic image M2, the person 402 who is present in the position of the entrance 401a in the photographic image M2 has moved to a position around the center of the room 400 and apart from the entrance 401a in the photographic image M3, and the person 402 has disappeared from the position of the entrance 401a. Therefore, in the changing part detecting section 110a, the photographic image M3 is judged as including a changing part (Yes in Step S2).

Then, it is judged in the moving part detecting section 110b whether or not the photographic image M3 includes a moving part (Step S4). Whether or not the photographic image M3 includes a moving part is judged, in comparison between the photographic image M3 and the photographic image M2 of the photographic frame preceding the photographic frame at which the photographic image M3 is obtained by the photographing, based on whether or not both contain a plurality of pixels in a cluster which exhibit an approximate distribution of pixel information, and whether or not the formation position of the plurality of pixels in the image obtained by the photographing is different.

A person image part M3a of the photographic image M3 corresponding to a pixel part in which the person 402 is photographed is judged as having a distribution of the pixel information approximate to that of the person image part M2a of the photographic image M2, and is judged as different in the formation position in the image obtained by the photographing. Therefore, the person image part M3a is judged as a moving part (Yes in Step S4).

Figure 5C:
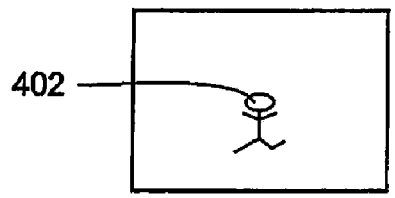

Then, an image of an area including the person image part M3a judged as the moving part is cut out as a moving area image M3a' by the moving area image cutout processing section 110d (Step S7). Herein, an image area over approximately ¼ of a range in a peripheral direction of a contour of the photographic image M3 is cut out as the moving area image M3a'. Then, the moving area image M3a' is subjected by the corrected/enlarged image generating section 110e to the correction of the distortion aberration due to the photographic lens 221 and to the enlargement processing (Step S6), and as illustrated in FIG. 5(C), the moving area image M3a' is displayed on the monitor 150 as the picture resulting from the enlargement without a distortion (Step S3).

Further subsequently, the photographic image M4 illustrated in FIG. 4(D) is read as the image obtained by the photographing at the photographic frame succeeding the photographic frame at which the photographic image M3 is obtained by the photographing (Step S1). In comparison between the photographic image M4 and the photographic image M3, the person 402 who is present around the center of the room 400 in the photographic image M3 has moved to the position of the entrance 401b in the photographic image M4, and the person has disappeared from around the center of the room 400. Therefore, in the changing part detecting section 110a, the photographic image M4 is judged as including a changing part (Yes in Step S2).

Then, it is judged in the moving part detecting section 110b whether or not the picked-up image M4 includes a moving part (Step S4). Whether or not the photographic image M4 includes a moving part is judged, in comparison between the photographic image M4 and the photographic image M3 of the photographic frame preceding the photographic frame at which the photographic image M4 is obtained by the photographing, based on whether or not both contain a plurality of pixels in a cluster which exhibit an approximate distribution of pixel information, and whether or not the formation position of the plurality of pixels in the image obtained by the photographing is different.

A person image part M4a of the photographic image M4 corresponding to a pixel part in which the person 402 is photographed is judged as having a distribution of the pixel information approximate to that of the person image part M3a of the photographic image M3, and is judged as different in the formation position in the image obtained by the photographing. Therefore, the person image part M4a is judged as a moving part (Yes in Step S4).

Figure 5D:
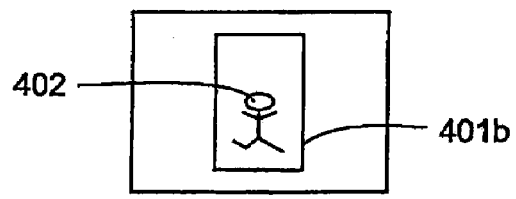

Then, an image of an area including the person image part M4a that is judged as a moving part is cut out as a moving area image M4a' by the moving area image cutout processing section 110d (Step S7). Herein, an image area over approximately ¼ of a range in a peripheral direction of a contour of the photographic image M4 is cut out as the moving area image M4a'. Then, the moving area image M4a' is subjected by the corrected/enlarged image generating section 110e to the correction of the distortion aberration due to the photographic lens 221 and to the enlargement processing (Step S6), and as illustrated in FIG. 5(D), the moving area image M4a' is displayed onto the monitor 150 as the picture resulting from the enlargement without a distortion (Step S3).

Then, further subsequently, the photographic image M5 illustrated in FIG. 4(E) is read as the image obtained by the photographing at the photographic frame succeeding the photographic frame at which the photographic image M4 is obtained by the photographing (Step S1). In comparison between the photographic image M5 and the photographic image M4, the person 402 who is present in the position of the entrance 401b in the photographic image M4 has moved out of the entrance 401b and is not present in the photographic image M5. Then, only the image of the entrance 401b appears in the part of the entrance 401b. In other words, the person image part M4a appears in the position of the entrance 401b in the photographic image M4, and does not appear there in the photographic image M5. Therefore, in the changing part detecting section 110a, the photographic image M5 is judged as including a changing part (Yes in Step S2). Therefore, the photographic image M5 is judged as including a changing part in the part of the entrance 401b (Yes in Step S2).

Then, it is judged in the moving part detecting section 110b whether or not the picked-up image M5 includes a moving part (Step S4). Whether or not the photographic image M5 includes a moving part is judged, in comparison between the photographic image M5 and the photographic image M4 of the photographic frame preceding the photographic frame at which the photographic image M5 is obtained by the photographing, based on whether or not both contain a plurality of pixels in a cluster which exhibit an approximate distribution of pixel information, and whether or not the formation position of the plurality of pixels in the image obtained by the photographing is different.

With regard to the photographic images M4 and M5, the entrances 401a and 401b are each a plurality of pixels in a cluster which exhibit an approximate distribution of pixel information but which are not different in the formation position in the image obtained by the photographing, and hence are not judged as a moving part. Further, with regard to the person image part M4a of the photographic image M4, a plurality of pixels having a distribution of the pixel information approximate to that of the part do not exist in the photographic image M5. Therefore, it is judged that the photographic image M5 does not include a moving part (No in Step S4).

Then, an image of an area corresponding to the part of the entrance 401b is cut out as a changing area image M5a' by the changing area image cutout processing section 110c (Step S5). Herein, an image area over approximately ¼ of a range in a peripheral direction of a contour of the photographic image M5 is cut out as the changing area image M5a'.

Figure 5E:
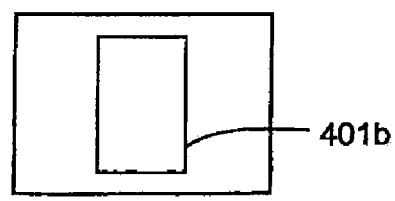

Then, the changing area image M5a' is subjected by the corrected/enlarged image generating section 110e to the correction of the distortion aberration due to the photographic lens 221 and to the enlargement processing (Step S6), and as illustrated in FIG. 5(E), the changing area image M5a' is displayed onto the monitor 150 as the picture resulting from the enlargement without a distortion (Step S3).

Figure 5F:
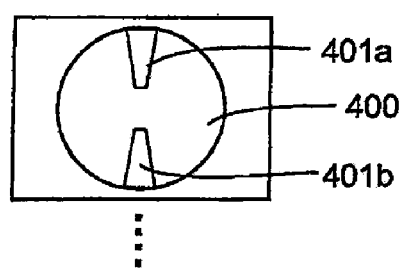

Then, further subsequently, the photographic image M6 illustrated in FIG. 4(F) is read as the image obtained by the photographing at the photographic frame succeeding the photographic frame at which the photographic image M5 is obtained by the photographing (Step S1). The photographic image M6 and the photographic image M5 are the images obtained by the photographing after the person 402 has moved out of the room 400. In other words, the photographic image M6 and the photographic image M5 are the images obtained by photographing the inside of the uninhabited room 400 in which there is nothing moving, and therefore are both the same image obtained by the photographing. Therefore, the photographic image M6 is judged as including no changing part (No in Step S2), and the entire range picture is displayed onto the monitor 150 as illustrated in FIG. 5(F).

Until there occurs a change again in the inside of the room 400, for example, the person 402 enters the room 400, there occurs no change in the photographic image M6 of each photographic frame, and hence the reading of an image obtained by photographing (Step S1), the judgment resulting in negative as to whether or not there is a changing part (No in Step S2), and the displaying of the entire range picture onto the monitor 150 (Step S3) are repeatedly performed. In other words, the entire range picture illustrated in FIG. 5(F) is kept being displayed on the monitor 150.

While the image obtained by the photographing and recorded on the HDD 300 is being reproduced on the monitor 150, if there is no change in the image obtained by the photographing, the entire range picture of the subject is displayed on the monitor 150, and if there occurs a change in the subject, a part including the change is cut out, the cut-out part is subjected to the correction of the distortion aberration due to the photographic lens 221, and the corrected/enlarged image resulting from the enlargement is displayed on the monitor 150 to thereby prevent the change in the subject from being missed and make it possible to watch the picture of the subject corresponding to the changing part with accuracy.

Further, as illustrated in FIGS. 4(B), 4(C), and 4(D), the range to be cut out as the moving area image (moving area image M3a' or M4a') is changed in accordance with the moving part (person image part M3a or M4a, respectively) of the image obtained by the photographing. In other words, when the subject includes a moving part, the range of the moving area image cut out by the moving area image cutout processing section 110d is changed in accordance with the moving part. Then, on the monitor 150, the picture of the moving part included in the subject can be watched as the picture of the moving area image that has been subjected to the correction of the distortion aberration due to the photographic lens 221 and to the enlargement processing. This prevents the movement of the subject from being missed and makes it possible to watch the picture of the subject corresponding to the moving part with accuracy.

Note that the range to be cut out as the changing area image or the moving area image is set as approximately ¼ of the range in the peripheral direction of the contour of the image obtained by the photographing in the above-mentioned embodiment, but may be appropriately set in accordance with the contents of the subject or the like. For example, when the changing part or the moving part is small, the range to be cut out as the changing area image or the moving area image may be narrowed, and a magnification used when being displayed on the monitor 150 may be increased. In contrast, in a case where situations surrounding the changing part or the moving part are to be watched in a wider scope, the range to be cut out as the changing area image or the moving area image may be widened. Note that the changing area image or the moving area image is preferably formed to have a shape (in general, rectangle having an aspect ratio of 4:3) matching a display surface of the monitor 150 in a state where the distortion aberration due to the photographic lens 221 has been corrected.

The above-mentioned description is made of the case where the subject has one portion as the changing part or the moving part. Hereinafter, by referring to FIGS. 6(A)-(G) and 7(A)-(G), description is made of a case where a plurality of portions occur as the changing parts or the moving parts of the subject.

In the same manner as FIGS. 4(A)-(F), FIGS. 6(A)-(G) are images obtained by photographing the inside of the room 400, which is the inside of the uninhabited office, as the subject by the camera section 200, the images being recorded on the HDD 300. FIGS. 6(A)-(G) are different from FIGS. 4(A)-(F) in that the changing part and the moving part of the room 400 (subject) correspond to one portion (one person 402) in FIGS. 4(A)-(F), while the subject illustrated in FIGS. 6(A)-(G) has two portions (two persons 402) as the changing parts and the moving parts of the room 400 (subject). In other words, FIGS. 6(A)-(G) illustrate the case where a plurality of portions occur as the changing parts or the moving parts of the subject.

In the same manner as FIGS. 4(A)-(F), in FIGS. 6(A)-(G), the photographing is also sequentially performed in such an order as parts (A), . . . , (B), (C), (D), (E), (F), . . . of FIG. 6. Further, in the same manner as FIGS. 5(A)-(F), FIGS. 7(A)-(G) illustrate contents of pictures displayed on the monitor 150 after the images obtained by the photographing and recorded on the HDD 300, which are illustrated in parts (A), . . . , (B), (C), (D), (E), (F), . . . of FIG. 6, are subjected to the image processing by the image processing apparatus 100. FIGS. 7(A), 7(B), 7(C), 7(D), 7(E), and 7(F) correspond to FIGS. 6(A), 6(B), 6(C), 6(D), 6(E), and 6(F), respectively. Further, on the image-pickup surface of the image-pickup element 230, as illustrated in FIGS. 6(A) to 6(F) a circular image is obtained by the imaging in correspondence with a shape of the photographic lens 221.

Figure 6A:
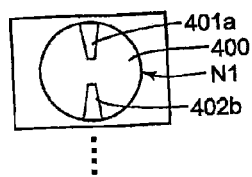
FIGS. 6(A)-(G) are diagrams illustrating contents of images obtained by photographing and recorded on the HDD illustrated in FIG. 1.

The room 400 is originally uninhabited. Therefore, while there is no moving object inside the room 400, as illustrated in FIG. 6(A), photographic images N1 of the inside of the room 400 each including entrances 401a and 401b that are stationary objects are recorded on the HDD 300 by the number of photographic frames during a photographed time period. The photographic images N1 of the respective photographic frames are different in photographed time instant, but since no part that is moving is included inside the room 400, namely, the subject, images obtained by photographing which have the same contents as the images obtained by the photographing are recorded on the HDD 300 as the photographic images N1 of a plurality of photographic frames.

Figure 6B:
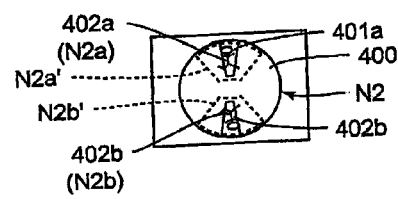

However, as illustrated in FIG. 6(B), when a person 402a is about to illegally enter the room 400 through the entrance 401a, and when a person 402b is about to illegally enter the room 400 through the entrance 401b, a photographic image N2 is obtained by the photographing, and is recorded onto the HDD 300. Then, while the person 402a and the person 402b are moving inside the room 400, a photographic image N3 illustrated in FIG. 6(C) and a photographic image N4 illustrated in FIG. 6(D) are sequentially obtained by the photographing, and are recorded onto the HDD 300. Then, after the person 402a and the person 402b have moved away out of the room 400 through the entrance 401b and the entrance 401a, respectively, since there is nothing moving left inside the room 400, as illustrated in FIGS. 6(E) and 6(F), photographic images N5 and N6 of the inside of the room 400 including the entrances 401a and 401b are obtained by the photographing, and are recorded onto the HDD 300. In the same manner as the photographic images N1, photographic images N6 are recorded by the number of photographic frames during a photographed time period.

Note that the photographic images N1, N2, N3, N4, N5, and N6 are of continuous photographic frames. Further, since photographing is performed at ten and several frames to several tens of frames per second, a distance by which the person 402 moves between the continuous photographic frames is slight. Therefore, an actual movement amount by which the person 402 moves between the continuous photographic frames in the images obtained by the photographing is also slight. However, herein, for the sake of explanation, the movement amount in the images obtained by the photographing is indicated to be large, making it easy to recognize that the person 402 is moving.

Next, by referring to the flowchart of FIG. 3, description is made of the image processing performed when the photographic images N1, N2, N3, N4, N5, and N6 recorded on the HDD 300 are reproduced.

Figure 7A:
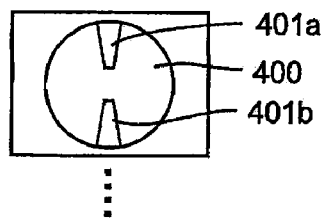
FIGS. 7(A)-(G) are diagrams illustrating pictures obtained when the images obtained by photographing and recorded on the HDD illustrated in FIG. 1 are displayed on the monitor after being subjected to the image processing by the image processing apparatus.

First, images obtained by photographing and recorded on the HDD 300 are read every photographic frame in an order of the photographic time instant (Step S1). Herein, the photographic image N1 is first read. Then, with regard to the photographic image N1, it is judged in the changing part detecting section 110a whether or not the photographic image N1 includes a changing part (Step S2). The photographic image N1 is an image obtained by photographing at a first photographic frame, which means no image obtained by the photographing is available for the comparison, and is therefore judged as including no changing part (No in Step S2). Then, a picture corresponding to the photographic image N1 is displayed onto the monitor 150 as an entire range picture as illustrated in FIG. 7(A) (Step S3).

Subsequently, a second photographic frame is read. The second photographic frame is set as a photographic frame obtained before the person 402a and the person 402b illustrated in FIG. 6(B) have illegally entered the room 400 yet. Therefore, the photographic image N1 having the same subject content as the photographic image N1 of the first photographic frame is read. Then, it is judged in the changing part detecting section 110a whether or not the photographic image N1 of the second photographic frame includes a changing part (Step S2). There is no change in the subject photographed at the first and second photographic frames, and hence there is no change in the pixel information on the pixels of the photographic images N1 of the first and second photographic frames. Therefore, it is judged in the changing part detecting section 110a that there is no changing part in the photographic images N1 of the first and second photographic frames (No in Step S2), and the entire range picture illustrated in FIG. 7(A) is displayed onto the monitor 150 in the same manner as the photographic image N1 of the first photographic frame.

Until the person 402a and the person 402b have illegally entered the room 400, there occurs no change in the photographic image N1 of each photographic frame, and hence the reading of an image obtained by photographing (Step S1), the judgment resulting in negative as to whether or not there is a changing part (No in Step S2), and the displaying of the entire range picture onto the monitor 150 (Step S3) are repeatedly performed. In other words, the entire range picture illustrated in FIG. 7(A) is kept being displayed on the monitor 150.

Then, when the photographic image N2 illustrated in FIG. 6(B) is read as the image obtained by the photographing when the person 402a and the person 402b illegally enter the room 400 (Step S1), it is judged that the photographic image N2 includes a changing part (Yes in Step S2). In comparison between the picked-up image N2 and the photographic image N1 of the photographic frame preceding the photographic frame at which the picked-up image N2 is obtained by the photographing, the person 402a and the person 402b who are not photographed in the photographic image N1 is photographed in the photographic image N2. In terms of person image parts N2a and N2b corresponding to a pixel part in which the person 402a and the person 402b are photographed, the photographic image N2 is different from the photographic image N1 with the cluster of the pixel information. In other words, the person image part N2a and the person image part N2b are judged as the changing part of the photographic image N2 (Yes in Step S2).

Subsequently, it is judged whether or not the photographic image N2 includes a moving part (Step S4). With regard to the photographic images N1 and N2, the entrances 401a and 401b are each a plurality of pixels in a cluster which exhibit an approximate distribution of pixel information but which are not different in the formation position in the image obtained by the photographing, and hence are not judged as a moving part. Further, with regard to the person image part N2a and N2b of the photographic image N2, a plurality of pixels having a distribution of the pixel information approximate to that of the part do not exist in the photographic image N1. Therefore, it is judged that the photographic image N2 does not include a moving part (No in Step S4).

Then, in Step S5, a processing of cutting out a changing area is performed by the changing area image cutout processing section 110c. In the changing area image cutout processing section 110c, when there are a plurality of changing parts, and when the changing parts do not exist within a predetermined distance, the cutting out of the changing area image is performed on each of the changing parts. The predetermined distance is set as, for example, such a distance as to cause the changing parts to fall within a changing area image cutout range. Herein, the changing area image cutout range is set as approximately ¼ of a range in a peripheral direction of a contour of the photographic image N2. The person image parts N2a and N2b are located in a diameter direction against the peripheral direction of the contour of the photographic image N2. Accordingly, the person image parts N2a and N2b do not fall within the changing area image cutout range. Therefore, the changing area image cutout processing section 110c cuts out an image corresponding to an area including the person image part N2a as a changing area image N2a', and an image corresponding to an area including the person image part N2b as a changing area image N2b' (Step S5). The changing area image N2a' and the changing area image N2b' are each cut out as an image area over approximately ¼ of the range in the peripheral direction of the contour of the photographic image N2.

Figure 7B:
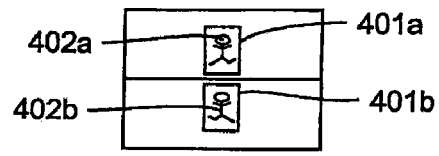

Then, the changing area image N2a' and the changing area image N2b' are subjected by the corrected/enlarged image generating section 110e to the correction of the distortion aberration due to the photographic lens 221 and to an enlargement processing (Step S6), and as illustrated in FIG. 7(B), the changing area image N2a' and the changing area image N2b' are displayed, respectively, onto the upper half and the lower half of the monitor 150 as the pictures resulting from the enlargement without a distortion (Step S3). FIG. 7(B) illustrates a picture corresponding to the changing area image N2a' on the upper half, and a picture corresponding to the changing area image N2b' on the lower half.

Figure 6C:
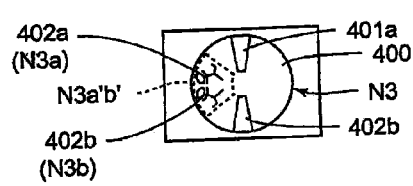
Figure 6D:
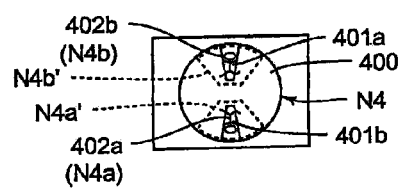
Figure 6E:
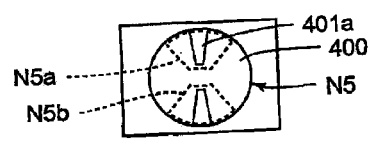
Figure 6F:
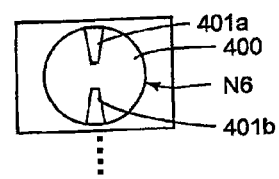
Figure 6G:
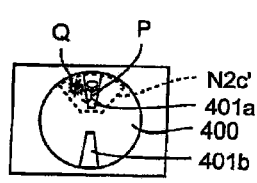

Incidentally, as illustrated in FIG. 6(G), in a case where two changing parts P and Q are generated within the changing area image cutout range, in Step S5, the changing area image cutout processing section 110c cuts out an image corresponding to an area including the two changing parts P and Q as a changing area image N2c'. Then, the changing area image N2c' is subjected by the corrected/enlarged image generating section 110e to the correction of the distortion aberration due to the photographic lens 221 and to the enlargement processing (Step S6). Then, as illustrated in FIG. 7(G), the changing area image N2c' is displayed as the picture resulting from the enlargement without a distortion (Step S3).

As described above, when the plurality of changing parts exist within such a distance as to fall within the changing area image cutout range, by including the plurality of changing parts in one changing area image, it is possible to prevent an overlapping subject part from being displayed as different pictures when the changing area image is corrected/enlarged on the monitor 150. For example, in a case where the changing area images are cut out respectively for the changing part P and the changing part Q and where pictures obtained by correcting/enlarging the respective changing area images are displayed on the upper half and the lower half in the same manner as the pictures of FIG. 7(B), the same picture is displayed over a wide range of the upper and lower pictures, and may be felt unpleasant to watch. In addition, since the upper and lower pictures are separately displayed regardless of the same part displayed therein, the respective pictures become smaller. In contrast, as illustrated in FIG. 7(G), in a case where the two changing parts, namely, the changing part P and the changing part Q are displayed after being corrected/enlarged as one changing area image, the picture can be watched at a high magnification.

Subsequently, the photographic image N3 illustrated in FIG. 6(C) is read as the image obtained by the photographing at the photographic frame succeeding the photographic frame at which the photographic image N2 is obtained by the photographing (Step S1). In comparison between the photographic image N3 and the photographic image N2, the persons 402a and 402b are present in the position of the entrances 401a and 401b, respectively, in the photographic image N2, while the persons 402a and 402b have moved to a position around the center of the room 400 and apart from the entrances 401a and 401b, respectively, in the photographic image N3. Further, the persons 402a and 402b have disappeared from the positions of the entrances 401a and 401b, respectively. Therefore, in the changing part detecting section 110a, the photographic image N3 is judged as including a changing part (Yes in Step S2).

Then, it is judged in the moving part detecting section 110b whether or not the photographic image N3 includes a moving part (Step S4). Whether or not the photographic image N3 includes a moving part is judged, in comparison between the photographic image N3 and the photographic image N2 of the photographic frame preceding the photographic frame at which the photographic image N3 is obtained by the photographing, based on whether or not both contain a plurality of pixels in a cluster which exhibit an approximate distribution of pixel information, and whether or not the formation position of the plurality of pixels in the image obtained by the photographing is different.

A person image part N3a of the photographic image N3 corresponding to a pixel part in which the person 402a is photographed and the person image part N2a of the photographic image N2 are judged as having a distribution of the pixel information approximate to each other. Further, a person image part N3b corresponding to a pixel part in which the person 402b is photographed and the person image part N2b of the photographic image N2 are judged as having a distribution of the pixel information approximate to each other. In addition, the person image part N3a and the person image part N2a are judged as different in the formation position in the image obtained by the photographing. Further, the person image part N3b and the person image part N2b are judged as different in the formation position in the image obtained by the photographing. Therefore, the person image parts N3a and N3b are judged as moving parts (Yes in Step S4).

Then, in Step S7, a processing of cutting out a moving area is performed by the moving area image cutout processing section 110d. In the moving area image cutout processing section 110d, when there are a plurality of moving parts, and when the moving parts do not exist within a predetermined distance, the cutting out of the moving area image is performed on each of the moving parts. The predetermined distance is set as, for example, such a distance as to cause the moving parts to fall within a moving area image cutout range. Herein, the moving area image cutout range is set as the same cutout range as the above-mentioned changing area cutout range and as approximately ¼ of a range in a peripheral direction of a contour of the photographic image N3. The person image parts N3a and N3b are located adjacently to each other. Accordingly, the person image parts N3a and N3b are located in such a position as to fall within the moving area image cutout range. Therefore, the moving area image cutout processing section 110d cuts out an image corresponding to an area including the person image part N3a and the person image part N3b as a moving area image N3a'b' (Step S7). The moving area image N3a'b' is cut out as an image area over approximately ¼ of the range in the peripheral direction of the contour of the photographic image N3.

Figure 7C:
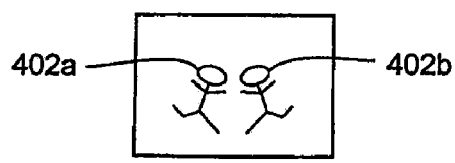

Then, the moving area image N3a'b' is subjected by the corrected/enlarged image generating section 110e to the correction of the distortion aberration due to the photographic lens 221 and to an enlargement processing (Step S6), and as illustrated in FIG. 7(C), the moving area image N3a'b' is displayed onto the monitor 150 as the picture resulting from the enlargement without a distortion (Step S3).

As described above, when the plurality of moving parts exist within such a distance as to fall within the moving area image cutout range, by including the plurality of moving parts in one moving area image, it is possible to prevent an overlapping subject part from being displayed as different pictures when the moving area image is corrected/enlarged on the monitor 150. For example, in a case where the moving area images are cut out respectively for the person image part N3a and the person image part N3b and where pictures obtained by correcting/enlarging the respective moving area images are displayed on the upper half and the lower half in the same manner as the pictures of FIG. 7(B), the same picture is displayed over a wide range of the upper and lower pictures, and may be felt unpleasant to watch. In addition, since the upper and lower pictures are separately displayed regardless of the same part displayed therein, the respective pictures become smaller. In contrast, as illustrated in FIG. 7(C), in a case where the two moving parts, namely, the person image part N3a and the person image part N3b are displayed after being corrected/enlarged as one moving area image, the picture can be watched at a high magnification.

Further subsequently, the photographic image N4 illustrated in FIG. 6(D) is read as the image obtained by the photographing at the photographic frame succeeding the photographic frame at which the photographic image N3 is obtained by the photographing (Step S1). In comparison between the photographic image N4 and the photographic image N3, the persons 402a and 402b who are present around the center of the room 400 in the photographic image N3 have moved to the positions of the entrance 401b and the entrance 401a, respectively, in the photographic image N4, and the persons have disappeared from the center of the room 400. Therefore, in the changing part detecting section 110a, the photographic image N4 is judged as including a changing part (Yes in Step S2).

Then, it is judged in the moving part detecting section 110b whether or not the picked-up image N4 includes a moving part (Step S4). Whether or not the photographic image N4 includes a moving part is judged, in comparison between the photographic image N4 and the photographic image N3 of the photographic frame preceding the photographic frame at which the photographic image N4 is obtained by the photographing, based on whether or not both contain a plurality of pixels in a cluster which exhibit an approximate distribution of pixel information, and whether or not the formation position of the plurality of pixels in the image obtained by the photographing is different.

A person image part N4a of the photographic image N4 corresponding to a pixel part in which the person 402a is photographed and the person image part N3a of the photographic image N3 are judged as having a distribution of the pixel information approximate to each other. Further, a person image part N4b corresponding to a pixel part in which the person 402b is photographed and the person image part N3b of the photographic image N3 are judged as having a distribution of the pixel information approximate to each other. In addition, the person image part N4a and the person image part N3a are judged as different in the formation position in the image obtained by the photographing. Further, the person image part N4b and the person image part N3b are judged as different in the formation position in the image obtained by the photographing. Therefore, the person image parts N4a and N4b are judged as a moving part (Yes in Step S4).

Then, in Step S7, a processing of cutting out a moving area is performed by the moving area image cutout processing section 11d. In the moving area image cutout processing section 11d, as described above, when there are a plurality of moving parts, and when the moving parts do not exist within a predetermined distance, the cutting out of the moving area image is performed on each of the moving parts. Herein, the predetermined distance is set as such a distance as to cause the moving parts to fall within a moving area image cutout range, and the moving area image cutout range is set as approximately ¼ of a range in a peripheral direction of a contour of the photographic image N3. The person image parts N4a and N4b are located in a diameter direction against the peripheral direction of the contour of the photographic image N4. Accordingly, the person image parts N4a and N4b do not fall within the moving area image cutout range. Therefore, the moving area image cutout processing section 110d cuts out an image corresponding to an area including the person image part N4a as a moving area image N4a', and an image corresponding to an area including the person image part N4b as a moving area image N4b' (Step S7). The moving area image N4a' and the moving area image N4b' are each cut out as an image area over approximately ¼ of the range in the peripheral direction of the contour of the photographic image N4.

Figure 7D:
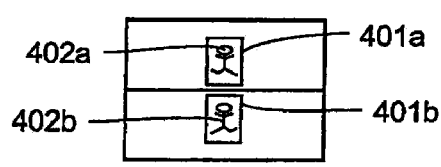

Then, the moving area image N4a' and the moving area image N4b' are subjected by the corrected/enlarged image generating section 110e to the correction of the distortion aberration due to the photographic lens 221 and to the enlargement processing (Step S6). Then, as illustrated in FIG. 7(D), the moving area image N4a' and the moving area image N4b' are displayed as the pictures resulting from the enlargement without a distortion onto the upper half and the lower half of the monitor 150, respectively (Step S3). FIG. 7(D) illustrates a picture corresponding to the moving area image N4b' on the upper half, and a picture corresponding to the moving area image N4a' on the lower half.

Then, further subsequently, the photographic image N5 illustrated in FIG. 6(E) is read as the image obtained by the photographing at the photographic frame succeeding the photographic frame at which the photographic image N4 is obtained by the photographing (Step S1). In comparison between the photographic image N5 and the photographic image N4, the persons 402b and 402a who are present in the position of the entrances 401a and 401b in the photographic image N4 have moved out of the entrances 401a and 401b and are not present in the photographic image N5. Then, only the images of the entrances 401a and 401b appear in the parts of the entrances 401a and 401b. In other words, the person image parts N4b and N4a appear in the positions of the entrances 401a and 401b, respectively, in the photographic image N4, and do not appear there in the photographic image N5. Therefore, in the changing part detecting section 110a, the photographic image N5 is judged as including a changing part (Yes in Step S2). Therefore, the photographic image N5 is judged as including a changing part in the parts of the entrances 401a and 401b (Yes in Step S2).

Then, it is judged in the moving part detecting section 110b whether or not the photographic image N5 includes a moving part (Step S4). Whether or not the photographic image N5 includes a moving part is judged, in comparison between the photographic image N5 and the photographic image N4 of the photographic frame preceding the photographic frame at which the photographic image N5 is obtained by the photographing, based on whether or not both contain a plurality of pixels in a cluster which exhibit an approximate distribution of pixel information, and whether or not the formation position of the plurality of pixels in the image obtained by the photographing is different.

With regard to the photographic images N4 and N5, the entrances 401a and 401b are each a plurality of pixels in a cluster which exhibit an approximate distribution of pixel information but which are not different in the formation position in the image obtained by the photographing, and hence are not judged as a moving part. Further, with regard to the person image part N4a of the photographic image N4, a plurality of pixels having a distribution of the pixel information approximate to that of the part do not exist in the photographic image N5. Still further, with regard to the person image part N4*b* of the photographic image N4, a plurality of pixels having a distribution of the pixel information approximate to that of the part do not exist in the photographic image N5. Therefore, it is judged that the photographic image M5 does not include a moving part (No in Step S4).

Then, an image of an area corresponding to the parts of the entrances 401*a* and 401*b* is cut out as changing area image N5*a*' and N5*b*', respectively, by the changing area image cutout processing section 110*c* (Step S5). Herein, an image area over approximately ¼ of a range of a contour of the photographic image N5 is cut out as the changing area image N5*a* and N5*b*.

Figure 7E:
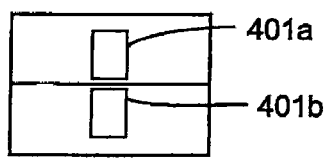

Then, the changing area image N5*a* and the changing area image N5*b* are subjected by the corrected/enlarged image generating section 110*e* to the correction of the distortion aberration due to the photographic lens 221 and to the enlargement processing (Step S6), and as illustrated in FIG. 7(E), the changing area image N5*a* and the changing area image N5*b* are displayed onto the upper half and the lower half of the monitor 150, respectively, as the picture resulting from the enlargement without a distortion (Step S3). FIG. 7(E) illustrates a picture corresponding to the changing area image N5*a* on the upper half, and a picture corresponding to the changing area image N5*b* on the lower half.

Figure 7F:
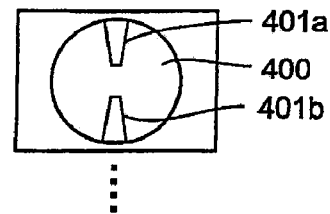
Figure 7G:
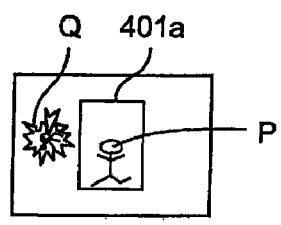

Then, further subsequently, the photographic image N6 illustrated in FIG. 6(F) is read as the image obtained by the photographing at the photographic frame succeeding the photographic frame at which the photographic image N5 is obtained by the photographing (Step S1). The photographic image N6 and the photographic image N5 are the images obtained by the photographing after the persons 402*a* and 402*b* have moved out of the room 400. In other words, the photographic image N6 and the photographic image N5 are the images obtained by photographing the inside of the uninhabited room 400 in which there is nothing moving, and therefore are both the same image obtained by the photographing. Therefore, the photographic image N6 is judged as including no changing part (No in Step S2), and the entire range picture is displayed onto the monitor 150 as illustrated in FIG. 7(F).

After that, until there occurs a change in the inside of the room 400, for example, the person 402 enters the room 400, there occurs no change in the photographic image N6 of each photographic frame, and hence the reading of an image obtained by photographing (Step S1), the judgment resulting in negative as to whether or not there is a changing part (No in Step S2), and the displaying of the entire range picture onto the monitor 150 (Step S3) are repeatedly performed. In other words, the entire range picture illustrated in FIG. 7(F) is kept being displayed on the monitor 150.

As described above, while the image obtained by the photographing and recorded on the HDD 300 is being reproduced on the monitor 150, if there occur a plurality of changing parts and moving parts in the image obtained by the photographing, each of the parts is subjected to the correction of the distortion aberration due to the photographic lens 221, and the corrected/enlarged image resulting from the enlargement is displayed on the monitor 150. Therefore, with regard to the plurality of changing parts and moving parts, the change and the movement of the subject cannot be missed, and the pictures of the subject corresponding to the changing parts and the moving parts can be watched with accuracy.

In the above-mentioned embodiment, in the moving part detecting section 110*b* performing Step S4, how many pixels the part to be judged as the moving part has moved by when the movement is judged is appropriately set depending on how high precision (sensitivity) is used for detecting the moving part. The smaller number of pixels based on which the movement is judged provides a higher precision (sensitivity), and the larger number thereof provides a lower precision (sensitivity).

In comparison between an image obtained by photographing a farther subject and an image obtained by photographing a nearer subject, the farther subject exhibits a larger movement amount of the subject per pixel that the nearer subject. Therefore, to photograph the farther subject, a detection precision (sensitivity) for the moving part may be set higher, and to photograph the nearer subject, the detection precision (sensitivity) for the moving part may be set lower.

Further, as in this embodiment, the image obtained by the photographing using a wide-angle photographic lens 221 exhibits a higher imaging magnifying power on a central side of the image than on a peripheral side thereof. Therefore, if the subject has the same distance from the photographic lens 221 in the images on the peripheral side and the central side, with regard to the movement amount of the subject per pixel, the subject on the central side has a larger movement amount than the subject on the peripheral side. Therefore, the detection precision (sensitivity) for the moving part may be set higher on the peripheral side than on the central side.

Note that the predetermined distance between the changing parts, which serves as a reference based on which it is judged whether or not a plurality of changing parts are made to fall within one changing area image, is judged based on whether or not the plurality of changing parts fall within one changing area image in the above-mentioned embodiment, but may also be set as follows. For example, in a case where two changing parts fall within one changing area image but are located on both sides of the area and facing each other, if those changing parts are to be included in one changing area image, it becomes unable to watch the images of the changing parts on the opposite side to the facing side thereof. Therefore, in such a case, by cutting out each of the changing parts as a changing area image, it is possible to watch the picture of each of changing images and a peripheral part thereof.

Further, the predetermined distance between the moving parts, which serves as a reference based on which it is judged whether or not a plurality of moving parts are made to fall within one moving area image, is not limited to the judgment based on whether or not the plurality of moving parts fall within one moving area image as in the above-mentioned embodiment. For example, in a case where two moving parts fall within one moving area image but are located on both sides of the area and facing each other, if those moving parts are to be included in one moving area image as described above, it becomes unable to watch the images of the moving parts on the opposite side to the facing side thereof. Therefore, in such a case, by cutting out each of the moving parts as a moving area image, it is possible to watch the picture of each of moving images and a peripheral part thereof.

Second Embodiment

In the above-mentioned first embodiment, a photographic frame rate is set as a relatively high photographic frame rate, for example, 16 frames/sec or 30 frames/sec, and the images obtained by photographing are reproduced as a moving image by being continuously reproduced in an order of the photographic frames. In contrast, the photographing may be performed by making photographic frame rate as small as, for example, 1 frame/sec.

Figure 8:
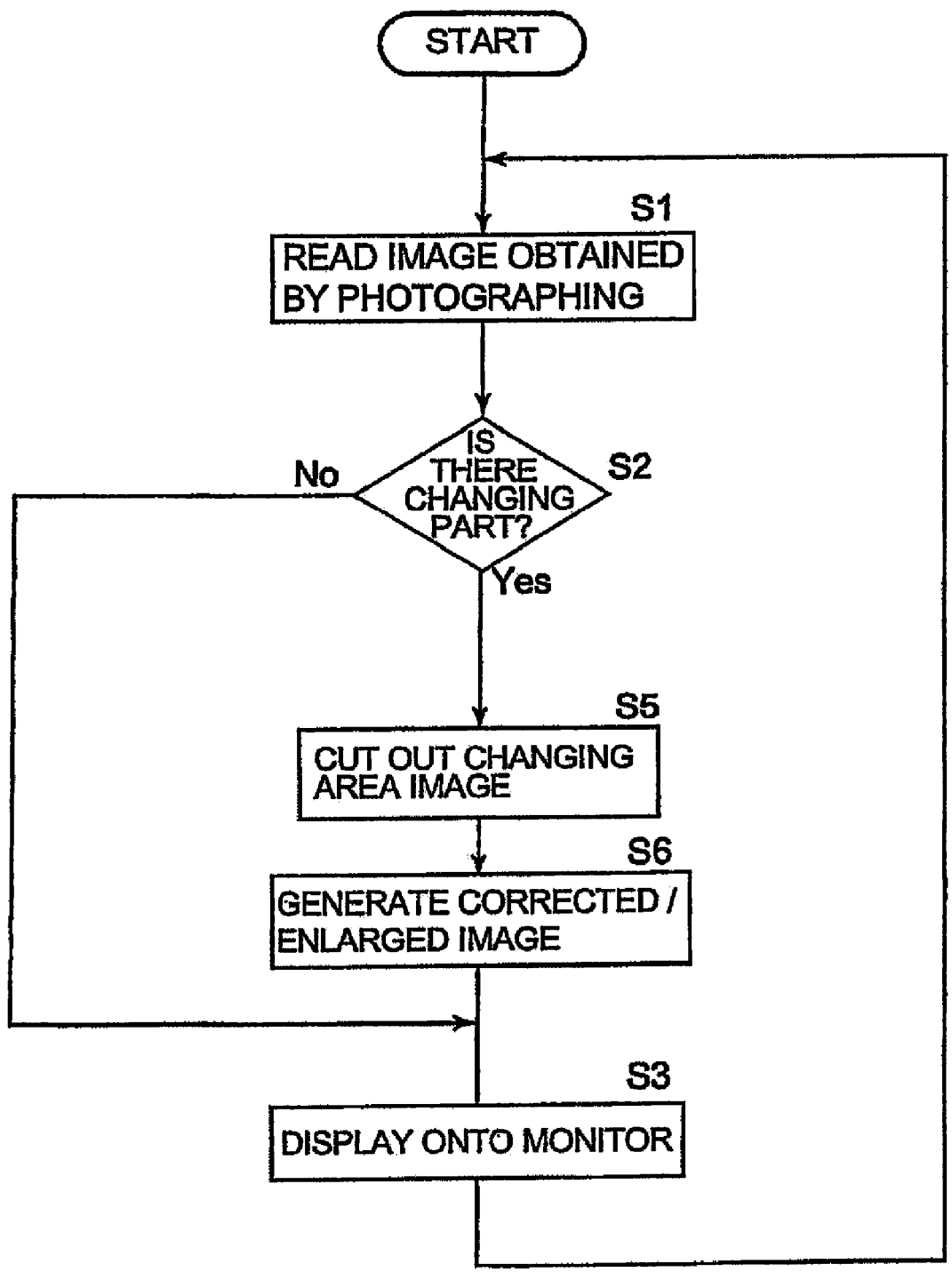
FIG. 8 is a flowchart illustrating an operation of an image processing apparatus according to a second embodiment of the present invention.

In the case where the photographing is performed at the small photographic frame rate, the detection of the moving part no longer has a significant purpose, and the detection of the changing part may often becomes a main purpose. For example, the photographic frame rate may be made small for the purpose of monitoring whether or not there is a suspicious object. In the case where the detection of the moving part is not performed, the image processing apparatus 100 may perform an image processing shown by a flowchart illustrated in FIG. 8 without including the moving part detecting section 110*b* or the moving area image cutout processing section 11*d*. The flowchart illustrated in FIG. 8 is obtained by omitting from the flowchart illustrated in FIG. 3 the processings of Step S4 and Step S7 regarding the detection of the moving part and the cutout processing for the moving part, respectively. The other processings (steps) are the same as those of FIG. 3. Therefore, detailed description thereof is omitted, and the outline of the operation is described below.

An image obtained by photographing is read (Step S1), and if there is no changing part (No in Step S2), the entire range picture is displayed onto the monitor 150 (Step S3). As long as there occurs no changing part in the subject due to, for example, placement of a suspicious object or the like, the processings of Step S1, No in Step S2, Step S3, and Step S1 are repeatedly performed, and the entire range picture is kept being displayed on the monitor 150.

On the other hand, in a case where there occurs a changing part in the subject due to, for example, placement of a suspicious object or the like within the subject (Yes in Step S2), a changing area image including the changing part is cut out (Step S5), and the changing area image is subjected to the correction of the distortion aberration due to the photographic lens 221 and to the enlargement processing (Step S6) to thereby display a picture resulting from the correction/enlargement onto the monitor 150.

In each of the above-mentioned embodiments, the corrected/enlarged image generating section 110*e* performs the correction of the distortion aberration due to the photographic lens 221 and the enlargement processing on the changing area images (for example, M2*a*' and M5*a*' in FIG. 4(A)-(F) or N2*a*', N2*b*', N5*a*', and N5*b*' in FIG. 6(A)-(G)) or the moving area images (for example, M3*a*' and M4*a*' in FIG. 4(A)-(F) or N3*a*', N3*b*', N4*a*', and N4*b*' in FIGS. 6(A)-(G)) (Step S6).

However, a corrected image may be generated by subjecting the changing area image or the moving area image to the correction of the distortion aberration due to the photographic lens 221 without being subjected to the enlargement processing, and the corrected image may be displayed onto the monitor 150 (Step S3).

Alternatively, the corrected/enlarged image generating section 110*e* can be configured as a corrected/reduced image generating section for subjecting the changing area image or the moving area image to the correction of the distortion aberration due to the photographic lens 221 and to a reduction processing. In a case of employing such a configuration, a picture resulting from the correction/reduction, in which the changing area image or the moving area image has been subjected to the correction of the distortion aberration due to the photographic lens 221 and to the reduction processing, is generated, and is displayed on the monitor 150 (Step S3).

Note that in a case where there are a plurality of changing area images or moving area images, corrected images or corrected/reduced images regarding the individual changing area images or moving area images are displayed in order on the monitor 150 so that a changing part or a moving part can be recognized at a glance.

Modified Example

In each of the above-mentioned embodiments, instead of displaying the changing part or the moving part onto the monitor 150, from among all of the photographic frames, the photographic frames including the changing part or the moving part may be gathered in another file as a changing part file or a moving part file, and recorded onto the HDD 300. According to this arrangement, if image data of the changing part/moving part file is reproduced, only the changing part or the moving part can be reproduced and watched. Note that not only the changing part/moving part file but also all of the photographic frames of the entire range picture may be recorded onto the HDD 300.

Note that a frame number assigned to the photographic frame including the changing part or the moving part and a chapter number of a chapter including the frame may be recorded. According to this arrangement, only the changing part or the moving part can be reproduced and watched based on the frame number or the chapter number.

Third Embodiment

Figure 9:
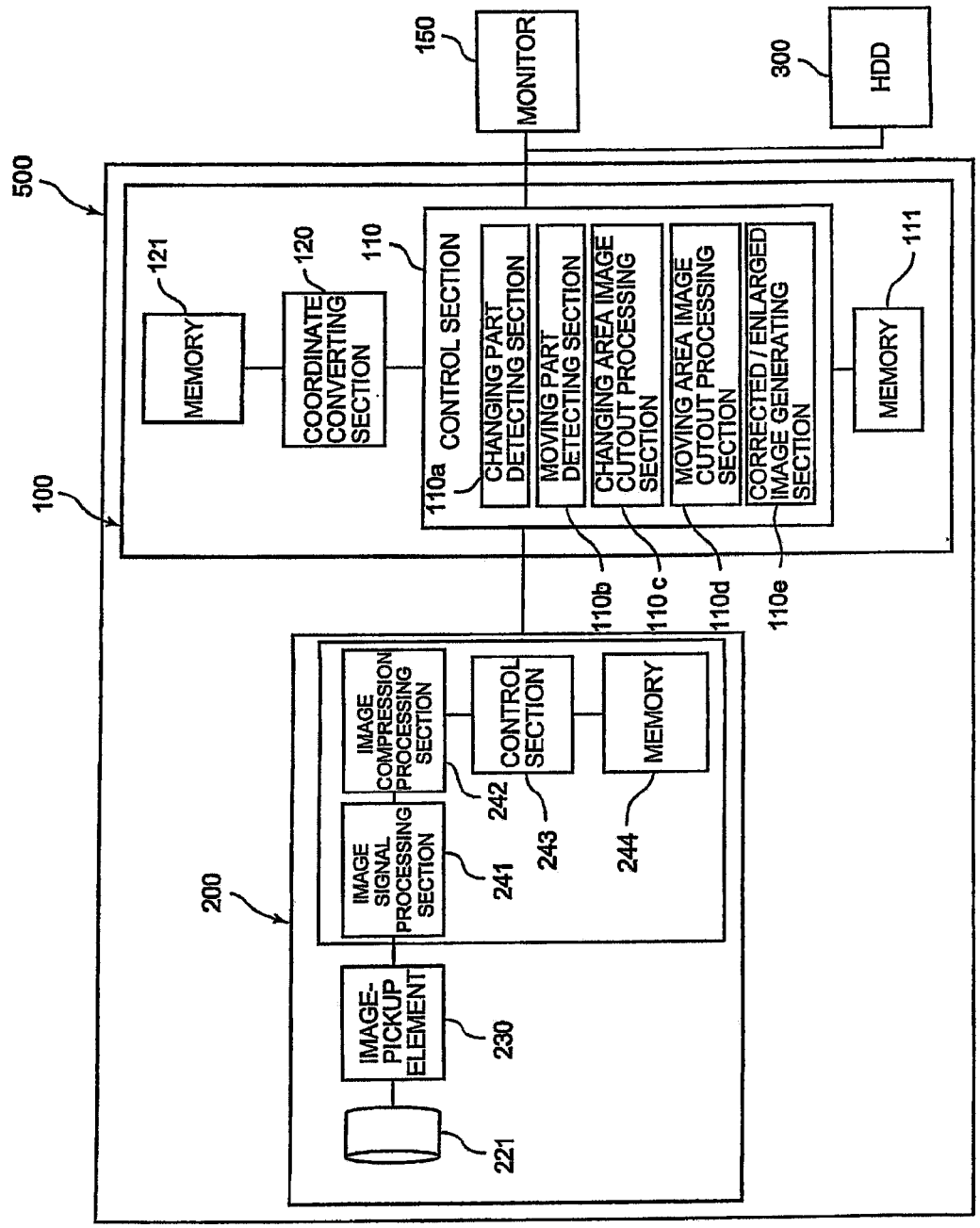
FIG. 9 is a block diagram illustrating a configuration illustrated by including an HDD and a monitor in a configuration of a camera apparatus according to a third embodiment of the present invention.

In each of the above-mentioned embodiments, the configuration is set so that the image obtained by photographing by the camera section 200 and recorded on the HDD 300 is reproduced after being subjected to the image processing by the image processing apparatus 100, but the configuration may be set so that the image obtained by the photographing by the camera section 200 is directly processed by the image processing apparatus 100. In other words, as illustrated in FIG. 9, the configuration may be implemented by a camera apparatus 500 including the image processing apparatus 100 and the camera section 200. The configurations of the image processing apparatus 100 and the camera section 200 are the same as those of the image processing apparatus 100 and the camera section 200 described above, and description thereof is omitted.

In the camera apparatus 500 thus configured, when the images illustrated in FIGS. 4(A)-(F) are obtained by photographing, the pictures illustrated in FIGS. 5(A)-(F) are displayed on the monitor 150. Further, when the images illustrated in FIGS. 6(A)-(G) are obtained by photographing, the pictures illustrated in FIGS. 7(A)-(G) are displayed on the monitor 150. Therefore, in a case where the monitor 150 is used to monitor a subject in real time, the change in the subject can reliably be recognized, and the changing area image including the changing part and the moving area image including the moving part are enlarged and displayed, which makes it possible to watch the accurate pictures of the changing part and the moving part.

Further, only the corrected/enlarged image of the changing area image or the moving area image which is output after being processed by the image processing apparatus 100 may be recorded on the recording unit such as the HDD 300. This arrangement makes it possible to reproduce and watch only the corrected/enlarged image of the changing area image or the moving area image.

In the example shown in each of the above-mentioned embodiments, example where the image processing apparatus 100 and the camera apparatus 500 are used for monitoring the inside of the office, but can be used for monitoring the inside/outside of a general residence, and can also be used when performing an ecological observation of a wild animal.

Further, the HDD 300 and the image processing apparatus 100 may be connected to each other through a network via a USB cable. Further, in the camera apparatus 500, the camera section 200 and the image processing apparatus 100 may be connected to each other through a network via a USB cable (not shown) connected to the USB connection section 202 of the camera section 200.

The invention claimed is:

1. An image processing apparatus for performing an image processing on images obtained by continuously photographing a subject and by imaging light therefrom on image-pickup unit through a wide-angle photographic lens, comprising:
   moving part detecting unit for detecting a moving part of the image obtained by the photographing, the moving part having occurred due to a change in the subject;
   moving area image cutting-out unit for cutting out, as a moving area image, an area including the image obtained by the photographing corresponding to the moving part in which a move has been detected by the moving part detecting unit; and
   corrected/enlarged image generating unit for generating a corrected/enlarged image by subjecting the moving area image to a correction processing for a distortion due to the photographic lens and to an enlargement processing.

2. An image processing apparatus according to claim 1, wherein the moving area image cutting-out unit cuts out, when there are a plurality of moving parts, the moving area image for each of the moving parts.

3. An image processing apparatus according to claim 1, wherein the moving area image cutting-out unit cuts out, when the plurality of moving parts exist within a predetermined distance, one moving area image including the plurality of moving parts.

4. An image processing apparatus according to any one of claim 1, wherein:
   the moving area image cutting-out unit cuts out the moving area image when a moving amount of the moving part exceeds a predetermined moving amount; and
   the predetermined moving amount differs depending on a position of the moving part in the image obtained by the photographing.

5. An image processing apparatus according to claim 1, wherein the image processing apparatus records the corrected/enlarged image into a recording section.

6. An image processing apparatus according to claim 1, wherein the image processing apparatus records at least one of a frame number of the corrected/enlarged image and a chapter number thereof into a recording section.

7. A camera apparatus, comprising the image processing apparatus according to claim 1.

8. An image processing apparatus for performing an image processing on images obtained by continuously photographing a subject and by imaging light therefrom on image-pickup unit through a wide-angle photographic lens, comprising:
   changing part detecting unit for detecting a changing part of the image obtained by the photographing, the changing part having occurred due to a change in the subject;
   changing area image cutting-out unit for cutting out, as a changing area image, an area including the image obtained by the photographing corresponding to the changing part in which the change has been detected by the changing part detecting unit; and
   corrected/enlarged image generating unit for generating a corrected/enlarged image by subjecting the changing area image to a correction processing for a distortion due to the photographic lens and to an enlargement processing.

9. An image processing apparatus according to claim 8, wherein the changing area image cutting-out unit cuts out, when there are a plurality of changing parts, the changing area image for each of the changing parts.

10. An image processing apparatus according to claim 8, wherein the changing area image cutting-out unit cuts out, when the plurality of changing parts exist within a predetermined distance, one changing area image including the plurality of changing parts.

11. An image processing apparatus for performing an image processing on images obtained by continuously photographing a subject and by imaging light therefrom on image-pickup unit through a wide-angle photographic lens, comprising:
   moving part detecting unit for detecting a moving part of the image obtained by the photographing, the moving part having occurred due to a change in the subject;
   moving area image cutting-out unit for cutting out, as a moving area image, an area including the image obtained by the photographing corresponding to the moving part in which a move has been detected by the moving part detecting unit;
   changing part detecting unit for detecting a changing part of the image obtained by the photographing, the changing part having occurred due to a change in the subject;
   changing area image cutting-out unit for cutting out, as a changing area image, an area including the image obtained by the photographing corresponding to the changing part in which the change has been detected by the changing part detecting unit; and
   corrected/enlarged image generating unit for generating a corrected/enlarged image by subjecting the moving area image or the changing area image to a correction processing for a distortion due to the photographic lens and to an enlargement processing.

12. An image processing method of performing an image processing on images obtained by continuously photographing a subject and by imaging light therefrom on image-pickup unit through a wide-angle photographic lens, the method comprising:
   detecting a moving part of the image obtained by the photographing, the moving part having occurred due to a change in the subject;
   cutting out, as a moving area image, an area including the image obtained by the photographing corresponding to the moving part in which a move has been detected in the detecting a moving part of the image; and
   generating a corrected/enlarged image by subjecting the image obtained by the photographing included in the moving area image to a correction processing for a distortion aberration due to the photographic lens and to an enlargement processing.

13. An image processing method of performing an image processing on images obtained by continuously photographing a subject and by imaging light therefrom on image-pickup unit through a wide-angle photographic lens, the method comprising:
   detecting a changing part of the image obtained by the photographing, the changing part having occurred due to a change in the subject;
   cutting out, as a changing area image, an area including the image obtained by the photographing corresponding to the changing part in which the change has been detected in the detecting a changing part of the image; and
   generating a corrected/enlarged image by subjecting the image obtained by the photographing included in the changing area image to a correction processing for a distortion aberration due to the photographic lens and to an enlargement processing.

14. An image processing method of performing an image processing on images obtained by continuously photographing a subject and by imaging light therefrom on image-pickup unit through a wide-angle photographic lens, the method comprising:

detecting a moving part of the image obtained by the photographing, the moving part having occurred due to a change in the subject;
   cutting out, as a moving area image, an area including the image obtained by the photographing corresponding to the moving part in which a move has been detected by the detecting a moving part of the image;
   detecting a changing part of the image obtained by the photographing, the changing part having occurred due to a change in the subject;
   cutting out, as a changing area image, an area including the image obtained by the photographing corresponding to the changing part in which the change has been detected by the detecting a changing part of the image; and
   generating a corrected/enlarged image by subjecting the moving area image or the changing area image to a correction processing for a distortion due to the photographic lens and to an enlargement processing.

15. An image processing apparatus for performing an image processing on images obtained by continuously photographing a subject and by imaging light therefrom on image-pickup unit through a photographic lens, comprising:

moving part detecting unit for detecting a moving part of the image obtained by the photographing, the moving part having occurred due to a change in the subject;
   moving area image cutting-out unit for cutting out, as a moving area image, an area including the image obtained by the photographing corresponding to the moving part in which a move has been detected by the moving part detecting unit; and
   corrected image generating unit for generating a corrected image by subjecting the moving area image to a correction processing for a distortion due to the photographic lens.

16. An image processing apparatus for performing an image processing on images obtained by continuously photographing a subject and by imaging light therefrom on image-pickup unit through a photographic lens, comprising:

changing part detecting unit for detecting a changing part of the image obtained by the photographing, the changing part having occurred due to a change in the subject;
   changing area image cutting-out unit for cutting out, as a changing area image, an area including the image obtained by the photographing corresponding to the changing part in which the change has been detected by the changing part detecting unit; and
   corrected image generating unit for generating a corrected image by subjecting the changing area image to a correction processing for a distortion due to the photographic lens.

17. An image processing apparatus for performing an image processing on images obtained by continuously photographing a subject and by imaging light therefrom on image-pickup unit through a photographic lens, comprising:

moving part detecting unit for detecting a moving part of the image obtained by the photographing, the moving part having occurred due to a change in the subject;
   moving area image cutting-out unit for cutting out, as a moving area image, an area including the image obtained by the photographing corresponding to the moving part in which a move has been detected by the moving part detecting unit;
   changing part detecting unit for detecting a changing part of the image obtained by the photographing, the changing part having occurred due to a change in the subject;
   changing area image cutting-out unit for cutting out, as a changing area image, an area including the image obtained by the photographing corresponding to the changing part in which the change has been detected by the changing part detecting unit; and
   corrected image generating unit for generating a corrected image by subjecting the moving area image or the changing area image to a correction processing for a distortion due to the photographic lens.

* * * * *